US012737766B1

(12) United States Patent
Chen et al.

(10) Patent No.: US 12,737,766 B1
(45) Date of Patent: Sep. 15, 2026

(54) SYSTEM AND METHOD FOR A WORKFLOW ORCHESTRATION PLATFORM FOR FRAUD DETECTION

(71) Applicant: Experian Information Solutions, Inc., Costa Mesa, CA (US)

(72) Inventors: Yi Chen, Dublin, CA (US); Ryan Wyeth Kemmer, Tempe, AZ (US); Teresa Tong Liu, San Jose, CA (US); Michael Lee Gross, Gilbert, AZ (US); Eng Kiat Koh, Foster City, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

(21) Appl. No.: 18/800,963

(22) Filed: Aug. 12, 2024

Related U.S. Application Data

(63) Continuation of application No. 17/449,904, filed on Oct. 4, 2021, now abandoned.

(60) Provisional application No. 63/087,756, filed on Oct. 5, 2020.

(51) Int. Cl.
*G06Q 20/00* (2012.01)
*G06Q 20/40* (2012.01)

(52) U.S. Cl.
CPC ................................ *G06Q 20/4016* (2013.01)

(58) Field of Classification Search
CPC ................................................. G06Q 20/4016
See application file for complete search history.

(56) References Cited

U.S. PATENT DOCUMENTS

| | | | |
|---|---|---|---|
| 2,074,513 | A | 3/1937 | Mills |
| 3,316,395 | A | 4/1967 | Lavin et al. |
| 3,752,904 | A | 8/1973 | Waterbury |
| 4,163,290 | A | 7/1979 | Sutherlin et al. |
| 5,274,547 | A | 12/1993 | Zoffel et al. |
| 5,323,315 | A | 6/1994 | Highbloom |
| 5,386,104 | A | 1/1995 | Sime |

(Continued)

FOREIGN PATENT DOCUMENTS

| | | |
|---|---|---|
| AU | 2011203185 | 7/2011 |
| AU | 2021215125 | 9/2021 |

(Continued)

OTHER PUBLICATIONS

Y. Dai, J. Yan, X. Tang, H. Zhao and M. Guo, "Online Credit Card Fraud Detection: a Hybrid Framework with Big Data Technologies," 2016 IEEE Trustcom/BigDataSE/ISPA, Tianjin, China, 2016, pp. 1644-1651 (Year: 2016).*

(Continued)

*Primary Examiner* — Matheus Ribeiro Stivaletti
(74) *Attorney, Agent, or Firm* — KNOBBE, MARTENS, OLSON & BEAR, LLP

(57) ABSTRACT

Embodiments of a decision analytics system with a workflow orchestration system is described herein. The decision analytics system can receive historical transaction data that can be used to train a machine learning algorithm of the workflow orchestration system. Based on one or more attributes associated with the historical transaction data, the machine learning algorithm can generate clusters of the historical transaction data and identify a backing application (for example, identity or fraud risk services) for the clusters for identifying fraudulent or potentially fraudulent transactions.

20 Claims, 15 Drawing Sheets

(56) References Cited

U.S. PATENT DOCUMENTS 5,414,833 A 5/1995 Hershey et al.
5,454,030 A 9/1995 de Oliveira et al.
5,504,675 A 4/1996 Cragun et al.
5,563,783 A 10/1996 Stolfo et al.
5,627,886 A 5/1997 Bowman
5,679,940 A 10/1997 Templeton et al.
5,696,907 A 12/1997 Tom
5,696,965 A 12/1997 Dedrick
5,739,512 A 4/1998 Tognazzini
5,742,775 A 4/1998 King
5,745,654 A 4/1998 Titan
5,752,242 A 5/1998 Havens
5,754,632 A 5/1998 Smith
5,774,868 A 6/1998 Cragun et al.
5,793,497 A 8/1998 Funk
5,809,478 A 9/1998 Greco et al.
5,819,226 A 10/1998 Gopinathan et al.
5,819,260 A 10/1998 Lu et al.
5,822,741 A 10/1998 Fischthal
5,832,068 A 11/1998 Smith
5,842,178 A 11/1998 Giovannoli
5,870,721 A 2/1999 Norris
5,872,921 A 2/1999 Zahariev et al.
5,878,403 A 3/1999 DeFrancesco
5,879,297 A 3/1999 Haynor et al.
5,884,289 A 3/1999 Anderson et al.
5,912,839 A 6/1999 Ovshinsky et al.
5,913,196 A 6/1999 Talmor et al.
5,943,666 A 8/1999 Kleewein et al.
5,950,179 A 9/1999 Buchanan et al.
5,987,440 A 11/1999 O'Neil et al.
5,999,907 A 12/1999 Donner
5,999,940 A 12/1999 Ranger
6,023,694 A 2/2000 Kouchi et al.
6,029,139 A 2/2000 Cunningham et al.
6,029,149 A 2/2000 Dykstra et al.
6,029,154 A 2/2000 Pettitt
6,029,194 A 2/2000 Tilt
6,044,357 A 3/2000 Garg
6,055,570 A 4/2000 Nielsen
6,094,643 A 7/2000 Anderson et al.
6,119,103 A 9/2000 Basch et al.
6,125,985 A 10/2000 Amdahl et al.
6,142,283 A 11/2000 Amdahl et al.
6,144,988 A 11/2000 Kappel
6,157,707 A 12/2000 Baulier et al.
6,182,219 B1 1/2001 Feldbau et al.
6,208,720 B1 3/2001 Curtis et al.
6,249,228 B1 6/2001 Shirk et al.
6,253,203 B1 6/2001 O'Flaherty et al.
6,254,000 B1 7/2001 Degen et al.
6,263,447 B1 7/2001 French et al.
6,269,349 B1 7/2001 Aieta et al.
6,282,658 B2 8/2001 French et al.
6,285,983 B1 9/2001 Jenkins
6,285,987 B1 9/2001 Roth et al.
6,292,795 B1 9/2001 Peters et al.
6,311,169 B2 10/2001 Duhon
6,317,783 B1 11/2001 Freishtat et al.
6,321,339 B1 11/2001 French et al.
6,330,546 B1 12/2001 Gopinathan et al.
6,397,197 B1 5/2002 Gindlesperger
6,418,436 B1 7/2002 Degen et al.
6,424,956 B1 7/2002 Werbos
6,448,889 B1 9/2002 Hudson
6,456,984 B1 9/2002 Demoff et al.
6,496,936 B1 12/2002 French et al.
6,505,193 B1 1/2003 Musgrave et al.
6,510,415 B1 1/2003 Talmor et al.
6,513,018 B1 1/2003 Culhane
6,532,459 B1 3/2003 Berson
6,542,894 B1 4/2003 Lee et al.
6,543,683 B2 4/2003 Hoffman
6,553,495 B1 4/2003 Johansson et al.
6,571,334 B1 5/2003 Feldbau et al.
6,597,775 B2 7/2003 Lawyer et al.
6,612,488 B2 9/2003 Suzuki
6,615,193 B1 9/2003 Kingdon et al.
6,658,393 B1 12/2003 Basch et al.
6,662,023 B1 12/2003 Helle
6,696,941 B2 2/2004 Baker
6,700,220 B2 3/2004 Bayeur et al.
6,714,918 B2 3/2004 Hillmer et al.
6,735,572 B2 5/2004 Landesmann
6,740,875 B1 5/2004 Ishikawa et al.
6,748,426 B1 6/2004 Shaffer et al.
6,751,626 B2 6/2004 Brown et al.
6,796,497 B2 9/2004 Benkert et al.
6,811,082 B2 11/2004 Wong
6,829,711 B1 12/2004 Kwok et al.
6,850,606 B2 2/2005 Lawyer et al.
6,857,073 B2 2/2005 French et al.
6,866,586 B2 3/2005 Oberberger et al.
6,871,287 B1 3/2005 Ellingson
6,873,979 B2 3/2005 Fishman et al.
6,898,574 B1 5/2005 Regan
6,907,408 B2 6/2005 Angel
6,908,030 B2 6/2005 Rajasekaran et al.
6,913,194 B2 7/2005 Suzuki
6,918,038 B1 7/2005 Smith et al.
6,920,435 B2 7/2005 Hoffman et al.
6,928,546 B1 8/2005 Nanavati et al.
6,930,707 B2 8/2005 Bates et al.
6,934,849 B2 8/2005 Kramer et al.
6,934,858 B2 8/2005 Woodhill
6,965,881 B1 11/2005 Brickell et al.
6,965,997 B2 11/2005 Dutta
6,973,462 B2 12/2005 Dattero et al.
6,973,575 B2 12/2005 Arnold
6,983,381 B2 1/2006 Jerdonek
6,983,882 B2 1/2006 Cassone
6,991,174 B2 1/2006 Zuili
6,993,659 B2 1/2006 Milgramm et al.
7,007,174 B2 2/2006 Wheeler et al.
7,028,052 B2 4/2006 Chapman et al.
7,035,855 B1 4/2006 Kilger et al.
7,069,240 B2 6/2006 Spero et al.
7,083,090 B2 8/2006 Zuili
7,089,592 B2 8/2006 Adjaoute et al.
7,092,891 B2 8/2006 Maus et al.
7,104,444 B2 9/2006 Suzuki
7,158,622 B2 1/2007 Lawyer et al.
7,162,640 B2 1/2007 Heath et al.
7,174,335 B2 2/2007 Kameda
7,188,078 B2 3/2007 Arnett et al.
7,203,653 B1 4/2007 McIntosh
7,212,995 B2 5/2007 Schulkins
7,222,779 B1 5/2007 Pineda-Sanchez et al.
7,225,977 B2 6/2007 Davis
7,234,156 B2 6/2007 French et al.
7,240,059 B2 7/2007 Bayliss et al.
7,240,363 B1 7/2007 Ellingson
7,246,067 B2 7/2007 Austin et al.
7,246,740 B2 7/2007 Swift et al.
7,254,560 B2 8/2007 Singhal
7,263,506 B2 8/2007 Lee et al.
7,272,728 B2 9/2007 Pierson et al.
7,272,857 B1 9/2007 Everhart
7,277,869 B2 10/2007 Starkman
7,277,875 B2 10/2007 Serrano-Morales et al.
7,283,974 B2 10/2007 Katz et al.
7,289,607 B2 10/2007 Bhargava et al.
7,290,704 B1 11/2007 Ball et al.
7,298,873 B2 11/2007 Miller, Jr. et al.
7,310,743 B1 12/2007 Gagne et al.
7,314,162 B2 1/2008 Carr et al.
7,314,167 B1 1/2008 Kiliccote
7,330,871 B2 2/2008 Barber
7,333,635 B2 2/2008 Tsantes et al.
7,340,042 B2 3/2008 Cluff et al.
7,343,149 B2 3/2008 Benco
7,356,516 B2 4/2008 Richey et al.
7,370,044 B2 5/2008 Mulhern et al.
7,370,351 B1 5/2008 Ramachandran et al.

(56) References Cited

U.S. PATENT DOCUMENTS 7,376,618 B1 5/2008 Anderson et al.
7,383,227 B2 6/2008 Weinflash et al.
7,386,448 B1 6/2008 Poss et al.
7,386,506 B2 6/2008 Aoki et al.
7,392,534 B2 6/2008 Lu et al.
7,395,273 B2 7/2008 Khan et al.
7,398,915 B1 7/2008 Pineda-Sanchez et al.
7,406,715 B2 7/2008 Clapper
7,412,228 B2 8/2008 Barclay et al.
7,418,431 B1 8/2008 Nies et al.
7,428,509 B2 9/2008 Klebanoff
7,433,855 B2 10/2008 Gavan et al.
7,433,864 B2 10/2008 Malik
7,438,226 B2 10/2008 Helsper et al.
7,444,518 B1 10/2008 Dharmarajan et al.
7,457,401 B2 11/2008 Lawyer et al.
7,458,508 B1 12/2008 Shao et al.
7,466,235 B1 12/2008 Kolb et al.
7,467,401 B2 12/2008 Cicchitto
7,480,631 B1 1/2009 Merced et al.
7,481,363 B2 1/2009 Zuili
7,490,052 B2 2/2009 Kilger et al.
7,490,356 B2 2/2009 Lieblich et al.
7,497,374 B2 3/2009 Helsper et al.
7,509,117 B2 3/2009 Yum
7,512,221 B2 3/2009 Toms
7,519,558 B2 4/2009 Ballard et al.
7,522,060 B1 4/2009 Tumperi et al.
7,533,808 B2 5/2009 Song et al.
7,536,346 B2 5/2009 Aliffi et al.
7,540,021 B2 5/2009 Page
7,542,993 B2 6/2009 Satterfield et al.
7,543,739 B2 6/2009 Brown et al.
7,543,740 B2 6/2009 Greene et al.
7,546,271 B1 6/2009 Chmielewski et al.
7,548,886 B2 6/2009 Kirkland et al.
7,552,467 B2 6/2009 Lindsay
7,562,184 B2 7/2009 Henmi et al.
7,562,814 B1 7/2009 Shao et al.
7,568,616 B2 8/2009 Zuili
7,575,157 B2 8/2009 Barnhardt et al.
7,581,112 B2 8/2009 Brown et al.
7,584,146 B1 9/2009 Duhon
7,587,368 B2 9/2009 Felsher
7,591,425 B1 9/2009 Zuili et al.
7,593,891 B2 9/2009 Kornegay et al.
7,606,401 B2 10/2009 Hoffman et al.
7,606,790 B2 10/2009 Levy
7,610,216 B1 10/2009 May et al.
7,610,229 B1 10/2009 Kornegay
7,610,243 B2 10/2009 Haggerty et al.
7,620,596 B2 11/2009 Knudson et al.
7,623,844 B2 11/2009 Herrmann et al.
7,630,924 B1 12/2009 Collins et al.
7,630,932 B2 12/2009 Danaher et al.
7,636,853 B2 12/2009 Cluts et al.
7,644,868 B2 1/2010 Hare
7,647,344 B2 1/2010 Skurtovich, Jr. et al.
7,647,645 B2 1/2010 Edeki et al.
7,653,593 B2 1/2010 Zarikian et al.
7,657,431 B2 2/2010 Hayakawa
7,668,769 B2 2/2010 Baker et al.
7,668,840 B2 2/2010 Bayliss et al.
7,668,921 B2 2/2010 Proux et al.
7,672,865 B2 3/2010 Kumar et al.
7,673,793 B2 3/2010 Greene et al.
7,676,418 B1 3/2010 Chung et al.
7,676,433 B1 3/2010 Ross et al.
7,685,096 B2 3/2010 Margolus et al.
7,686,214 B1 3/2010 Shao et al.
7,689,007 B2 3/2010 Bous et al.
7,689,505 B2 3/2010 Kasower
7,689,506 B2 3/2010 Fei et al.
7,690,032 B1 3/2010 Peirce
7,701,364 B1 4/2010 Zilberman
7,702,550 B2 4/2010 Perg et al.
7,707,163 B2 4/2010 Anzalone et al.
7,708,190 B2 5/2010 Brandt et al.
7,708,200 B2 5/2010 Helsper et al.
7,711,635 B2 5/2010 Steele et al.
7,711,636 B2 5/2010 Robida et al.
7,720,750 B2 5/2010 Brody
7,725,300 B2 5/2010 Pinto et al.
7,734,523 B1 6/2010 Cui et al.
7,735,125 B1 6/2010 Alvarez et al.
7,742,982 B2 6/2010 Chaudhuri et al.
7,747,520 B2 6/2010 Livermore et al.
7,747,521 B2 6/2010 Serio
7,747,559 B2 6/2010 Leitner et al.
7,752,084 B2 7/2010 Pettitt
7,752,236 B2 7/2010 Williams et al.
7,752,554 B2 7/2010 Biggs et al.
7,756,783 B2 7/2010 Crooks
7,761,379 B2 7/2010 Zoldi et al.
7,761,384 B2 7/2010 Madhogarhia
7,774,270 B1 8/2010 MacCloskey
7,778,885 B1 8/2010 Semprevivo et al.
7,779,456 B2 8/2010 Dennis et al.
7,779,457 B2 8/2010 Taylor
7,783,281 B1 8/2010 Cook et al.
7,783,515 B1 8/2010 Kumar et al.
7,788,184 B2 8/2010 Kane
7,792,715 B1 9/2010 Kasower
7,792,864 B1 9/2010 Rice et al.
7,793,835 B1 9/2010 Coggeshall et al.
7,801,811 B1 9/2010 Merrell et al.
7,801,828 B2 9/2010 Candella et al.
7,802,104 B2 9/2010 Dickinson
7,805,362 B1 9/2010 Merrell et al.
7,805,391 B2 9/2010 Friedlander et al.
7,809,797 B2 10/2010 Cooley et al.
7,813,944 B1 10/2010 Luk et al.
7,827,115 B2 11/2010 Weller et al.
7,832,006 B2 11/2010 Chen et al.
7,835,983 B2 11/2010 Lefner et al.
7,840,459 B1 11/2010 Loftesness et al.
7,841,004 B1 11/2010 Balducci et al.
7,844,520 B1 11/2010 Franklin
7,848,987 B2 12/2010 Haig
7,849,029 B2 12/2010 Crooks et al.
7,853,518 B2 12/2010 Cagan
7,853,526 B2 12/2010 Milana
7,853,533 B2 12/2010 Eisen
7,853,998 B2 12/2010 Blaisdell et al.
7,856,397 B2 12/2010 Whipple et al.
7,856,494 B2 12/2010 Kulkarni
7,860,769 B2 12/2010 Benson
7,860,783 B2 12/2010 Yang et al.
7,865,427 B2 1/2011 Wright et al.
7,865,439 B2 1/2011 Seifert et al.
7,865,937 B1 1/2011 White et al.
7,870,078 B2 1/2011 Clark et al.
7,870,599 B2 1/2011 Pemmaraju
7,873,382 B2 1/2011 Rydgren et al.
7,873,566 B1 1/2011 Templeton et al.
7,874,488 B2 1/2011 Parkinson
7,877,304 B1 1/2011 Coulter
7,877,784 B2 1/2011 Chow et al.
7,882,548 B2 2/2011 Heath et al.
7,890,433 B2 2/2011 Singhal
7,904,360 B2 3/2011 Evans
7,904,367 B2 3/2011 Chung et al.
7,908,242 B1 3/2011 Achanta
7,909,246 B2 3/2011 Hogg et al.
7,912,865 B2 3/2011 Akerman et al.
7,917,411 B1 3/2011 Bedell
7,917,715 B2 3/2011 Tallman, Jr.
7,925,582 B1 4/2011 Kornegay et al.
7,929,951 B2 4/2011 Stevens et al.
7,933,835 B2 4/2011 Keane et al.
7,941,363 B2 5/2011 Tanaka et al.
7,945,515 B2 5/2011 Zoldi et al.
7,950,577 B1 5/2011 Daniel
7,958,046 B2 6/2011 Doerner et al.

(56) References Cited

U.S. PATENT DOCUMENTS 7,961,857 B2 6/2011 Zoldi et al.
7,962,404 B1 6/2011 Metzger, II et al.
7,962,467 B2 6/2011 Howard et al.
7,970,679 B2 6/2011 Kasower
7,970,698 B2 6/2011 Gupta et al.
7,970,701 B2 6/2011 Lewis et al.
7,971,246 B1 6/2011 Emigh et al.
7,975,299 B1 7/2011 Balducci et al.
7,983,976 B2 7/2011 Nafeh et al.
7,983,979 B2 7/2011 Holland, IV
7,984,849 B2 7/2011 Berghel et al.
7,988,043 B2 8/2011 Davis
7,991,201 B2 8/2011 Bous et al.
7,991,689 B1 8/2011 Brunzell et al.
7,991,716 B2 8/2011 Crooks et al.
7,991,751 B2 8/2011 Peled et al.
7,995,994 B2 8/2011 Khetawat et al.
7,996,521 B2 8/2011 Chamberlain et al.
8,001,034 B2 8/2011 Chung et al.
8,001,042 B1 8/2011 Brunzell et al.
8,001,153 B2 8/2011 Skurtovich, Jr. et al.
8,001,597 B2 8/2011 Crooks
8,005,749 B2 8/2011 Ginsberg
8,006,291 B2 8/2011 Headley et al.
8,009,873 B2 8/2011 Chapman
8,019,678 B2 9/2011 Wright et al.
8,020,763 B1 9/2011 Kowalchyk et al.
8,024,263 B2 9/2011 Zarikian et al.
8,024,271 B2 9/2011 Grant
8,027,439 B2 9/2011 Zoldi et al.
8,027,518 B2 9/2011 Baker et al.
8,027,947 B2 9/2011 Hinsz et al.
8,028,168 B2 9/2011 Smithies et al.
8,028,326 B2 9/2011 Palmer et al.
8,028,329 B2 9/2011 Whitcomb
8,028,896 B2 10/2011 Carter et al.
8,032,448 B2 10/2011 Anderson et al.
8,032,449 B2 10/2011 Hu et al.
8,032,927 B2 10/2011 Ross
8,037,097 B2 10/2011 Guo et al.
8,037,512 B2 10/2011 Wright et al.
8,041,597 B2 10/2011 Li et al.
8,042,159 B2 10/2011 Basner et al.
8,042,193 B1 10/2011 Piliouras
8,049,596 B2 11/2011 Sato
8,055,667 B2 11/2011 Levy
8,056,128 B1 11/2011 Dingle et al.
8,058,972 B2 11/2011 Mohanty
8,060,424 B2 11/2011 Kasower
8,060,915 B2 11/2011 Voice et al.
8,060,916 B2 11/2011 Bajaj et al.
8,065,233 B2 11/2011 Lee et al.
8,065,525 B2 11/2011 Zilberman
8,069,053 B2 11/2011 Gervais et al.
8,069,084 B2 11/2011 Mackouse
8,069,256 B2 11/2011 Rasti
8,069,485 B2 11/2011 Carter
8,073,785 B1 12/2011 Candella et al.
8,078,569 B2 12/2011 Kennel
8,090,648 B2 1/2012 Zoldi et al.
8,104,679 B2 1/2012 Brown
8,116,731 B2 2/2012 Buhrmann et al.
8,121,962 B2 2/2012 Vaiciulis et al.
8,131,615 B2 3/2012 Diev et al.
8,151,327 B2 4/2012 Eisen
8,195,549 B2 6/2012 Kasower
8,201,257 B1 6/2012 Andres et al.
8,204,774 B2 6/2012 Chwast et al.
8,204,982 B2 6/2012 Casado et al.
8,214,262 B1 7/2012 Semprevivo et al.
8,214,285 B2 7/2012 Hu et al.
8,224,723 B2 7/2012 Bosch et al.
8,225,395 B2 7/2012 Atwood et al.
8,239,677 B2 8/2012 Colson
8,244,629 B2 8/2012 Lewis et al.
8,255,978 B2 8/2012 Dick
8,260,914 B1 9/2012 Ranjan
8,280,805 B1 10/2012 Abrahams et al.
8,280,833 B2 10/2012 Miltonberger
8,285,613 B1 10/2012 Coulter
8,285,636 B2 10/2012 Curry et al.
8,296,225 B2 10/2012 Maddipati et al.
8,296,229 B1 10/2012 Yellin et al.
8,296,250 B2 10/2012 Crooks et al.
8,332,338 B2 12/2012 Vaiciulis et al.
8,346,593 B2 1/2013 Fanelli
8,355,896 B2 1/2013 Kumar et al.
8,359,278 B2 1/2013 Domenikos et al.
8,364,588 B2 1/2013 Celka et al.
8,374,973 B2 2/2013 Herbrich et al.
8,386,377 B1 2/2013 Xiong et al.
8,429,070 B2 4/2013 Hu et al.
8,463,904 B2 6/2013 Casado et al.
8,468,090 B2 6/2013 Lesandro et al.
8,473,415 B2 6/2013 Siegel
8,489,479 B2 7/2013 Slater et al.
8,510,329 B2 8/2013 Balkir et al.
8,515,844 B2 8/2013 Kasower
8,516,439 B2 8/2013 Brass et al.
8,543,499 B2 9/2013 Haggerty et al.
8,548,137 B2 10/2013 Zoldi et al.
8,548,903 B2 10/2013 Becker
8,549,590 B1 10/2013 de Villiers Prichard et al.
8,559,607 B2 10/2013 Zoldi et al.
8,567,669 B2 10/2013 Griegel et al.
8,578,496 B1 11/2013 Krishnappa
8,607,353 B2 12/2013 Rippert, Jr
8,626,671 B2 1/2014 Federgreen
8,630,938 B2 1/2014 Cheng et al.
8,639,920 B2 1/2014 Stack et al.
8,645,301 B2 2/2014 Vaiciulis et al.
8,671,115 B2 3/2014 Skurtovich, Jr. et al.
8,676,684 B2 3/2014 Newman et al.
8,676,699 B2 3/2014 Phillips
8,676,726 B2 3/2014 Hore et al.
8,682,755 B2 3/2014 Bucholz et al.
8,683,586 B2 3/2014 Crooks
8,694,427 B2 4/2014 Maddipati et al.
8,707,445 B2 4/2014 Sher-Jan et al.
8,725,613 B1 5/2014 Celka et al.
8,745,698 B1 6/2014 Ashfield et al.
8,763,133 B2 6/2014 Sher-Jan et al.
8,776,225 B2 7/2014 Pierson et al.
8,781,953 B2 7/2014 Kasower
8,781,975 B2 7/2014 Bennett et al.
8,793,777 B2 7/2014 Colson
8,805,836 B2 8/2014 Hore et al.
8,812,387 B1 8/2014 Samler et al.
8,819,793 B2 8/2014 Gottschalk, Jr.
8,824,648 B2 9/2014 Zoldi et al.
8,826,393 B2 9/2014 Eisen
8,850,539 B2 9/2014 Bailey, Jr.
8,862,514 B2 10/2014 Eisen
8,862,526 B2 10/2014 Miltonberger
8,909,664 B2 12/2014 Hopkins
8,918,891 B2 12/2014 Coggeshall et al.
8,949,981 B1 2/2015 Trollope et al.
9,118,646 B2 8/2015 Pierson et al.
9,147,117 B1 9/2015 Madhu et al.
9,191,403 B2 11/2015 Zoldi et al.
9,194,899 B2 11/2015 Zoldi et al.
9,196,004 B2 11/2015 Eisen
9,210,156 B1 12/2015 Little et al.
9,235,728 B2 1/2016 Gottschalk, Jr. et al.
9,251,541 B2 2/2016 Celka et al.
9,256,624 B2 2/2016 Skurtovich, Jr. et al.
9,280,658 B2 3/2016 Coggeshall et al.
9,361,597 B2 6/2016 Britton et al.
9,367,520 B2 6/2016 Zhao et al.
9,390,384 B2 7/2016 Eisen
9,412,141 B2 8/2016 Prichard et al.
9,483,650 B2 11/2016 Sher-Jan et al.
9,489,497 B2 11/2016 MaGill et al.
9,531,738 B2 12/2016 Zoldi et al.

(56) References Cited

U.S. PATENT DOCUMENTS 9,558,368 B2 1/2017 Gottschalk, Jr. et al.
9,595,066 B2 3/2017 Samler et al.
9,600,845 B2 3/2017 Nordyke et al.
9,652,802 B1 5/2017 Kasower
9,704,195 B2 7/2017 Zoldi
9,710,523 B2 7/2017 Skurtovich, Jr. et al.
9,710,868 B2 7/2017 Gottschalk, Jr. et al.
9,754,256 B2 9/2017 Britton et al.
9,754,311 B2 9/2017 Eisen
9,760,885 B1 9/2017 Ramalingam et al.
9,773,227 B2 9/2017 Zoldi et al.
9,781,147 B2 10/2017 Sher-Jan et al.
9,805,216 B2 10/2017 Kraska et al.
9,953,321 B2 4/2018 Zoldi et al.
10,043,213 B2 8/2018 Straub et al.
10,089,411 B2 10/2018 Kassa
10,089,679 B2 10/2018 Eisen
10,089,686 B2 10/2018 Straub et al.
10,102,530 B2 10/2018 Zoldi et al.
10,115,153 B2 10/2018 Zoldi et al.
10,152,736 B2 12/2018 Yang et al.
10,217,163 B2 2/2019 Straub et al.
10,242,540 B2 3/2019 Chen et al.
10,339,527 B1 7/2019 Coleman et al.
10,373,061 B2 8/2019 Kennel et al.
10,404,472 B2 9/2019 Knopf
10,430,604 B2 10/2019 Spinelli et al.
10,438,308 B2 10/2019 Prichard et al.
10,482,542 B1 11/2019 Jain
10,497,034 B2 12/2019 Yang et al.
10,510,025 B2 12/2019 Zoldi et al.
10,521,857 B1 12/2019 Shao et al.
10,528,948 B2 1/2020 Zoldi et al.
10,579,938 B2 3/2020 Zoldi et al.
10,592,982 B2 3/2020 Samler et al.
10,593,004 B2 3/2020 Gottschalk, Jr. et al.
10,616,196 B1 4/2020 Khitrenovich et al.
10,692,058 B2 6/2020 Zoldi et al.
10,699,028 B1 6/2020 Kennedy et al.
10,713,711 B2 7/2020 Zoldi
10,769,290 B2 9/2020 Crawford et al.
10,791,136 B2 9/2020 Zoldi et al.
10,896,381 B2 1/2021 Zoldi et al.
10,896,472 B1 1/2021 Stack et al.
10,902,426 B2 1/2021 Zoldi et al.
10,909,617 B2 2/2021 Kasower
10,958,725 B2 3/2021 Knopf
10,977,363 B2 4/2021 Leitner et al.
10,990,979 B1 4/2021 Coleman et al.
10,999,298 B2 5/2021 Eisen
11,023,963 B2 6/2021 Zoldi et al.
11,025,428 B2 6/2021 Knopf
11,030,562 B1 6/2021 Dean et al.
11,037,229 B2 6/2021 Zoldi et al.
11,080,740 B2 8/2021 Billman et al.
11,087,334 B1 8/2021 McEachern et al.
11,093,845 B2 8/2021 Zoldi et al.
11,093,988 B2 8/2021 Zoldi et al.
11,100,506 B2 8/2021 Zoldi et al.
11,108,562 B2 8/2021 Knopf et al.
11,151,468 B1 10/2021 Chen et al.
11,157,650 B1 10/2021 Kennedy et al.
11,256,825 B2 2/2022 Spinelli et al.
11,354,670 B2 6/2022 Phelan et al.
11,367,074 B2 6/2022 Zoldi et al.
11,373,190 B2 6/2022 Zoldi et al.
11,380,171 B2 7/2022 Chen et al.
11,423,414 B2 8/2022 Zoldi et al.
11,431,736 B2 8/2022 Brown et al.
11,436,606 B1 9/2022 Coleman et al.
11,552,901 B2 1/2023 Hoover et al.
11,568,348 B1 1/2023 Dean et al.
11,580,259 B1 2/2023 Kennedy et al.
11,593,476 B2 2/2023 Van Dyke
11,625,730 B2 4/2023 Liu et al.
11,636,485 B2 4/2023 Zoldi et al.
11,658,994 B2 5/2023 Johnston et al.
11,665,004 B2 5/2023 Knopf
11,669,894 B2 6/2023 Nordyke et al.
11,777,972 B2 10/2023 Jones
11,804,306 B2 10/2023 Hua et al.
11,804,967 B2 10/2023 Knopf et al.
11,941,635 B1 3/2024 Coleman et al.
12,045,755 B1 7/2024 Dean et al.
12,099,940 B1 9/2024 Chen et al.
12,430,646 B2 9/2025 Seguritan
12,455,978 B1 10/2025 Kennel et al.
2001/0014868 A1 8/2001 Herz et al.
2001/0014878 A1 8/2001 Mitra et al.
2001/0027413 A1 10/2001 Bhutta
2001/0029470 A1 10/2001 Schultz et al.
2001/0034631 A1 10/2001 Kiselik
2001/0039523 A1 11/2001 Iwamoto
2002/0010684 A1 1/2002 Moskowitz
2002/0013899 A1 1/2002 Faul
2002/0019804 A1 2/2002 Sutton
2002/0019938 A1 2/2002 Aarons
2002/0032635 A1 3/2002 Harris et al.
2002/0040344 A1 4/2002 Preiser et al.
2002/0042879 A1 4/2002 Gould et al.
2002/0052841 A1 5/2002 Guthrie et al.
2002/0059521 A1 5/2002 Tasler
2002/0062185 A1 5/2002 Runge et al.
2002/0062281 A1 5/2002 Singhal
2002/0073044 A1 6/2002 Singhal
2002/0077178 A1 6/2002 Oberberger et al.
2002/0077964 A1 6/2002 Brody et al.
2002/0080256 A1 6/2002 Bates et al.
2002/0087460 A1 7/2002 Hornung
2002/0099649 A1 7/2002 Lee et al.
2002/0119824 A1 8/2002 Allen
2002/0130176 A1 9/2002 Suzuki
2002/0138417 A1 9/2002 Lawrence
2002/0138751 A1 9/2002 Dutta
2002/0147695 A1 10/2002 Khedkar et al.
2002/0156676 A1 10/2002 Ahrens et al.
2002/0161664 A1 10/2002 Shaya et al.
2002/0161711 A1 10/2002 Sartor et al.
2002/0173994 A1 11/2002 Ferguson, III
2002/0178112 A1 11/2002 Goeller et al.
2002/0184509 A1 12/2002 Scheidt et al.
2002/0188544 A1 12/2002 Wizon et al.
2003/0004879 A1 1/2003 Demoff et al.
2003/0009426 A1 1/2003 Ruiz-Sanchez
2003/0033261 A1 2/2003 Knegendorf
2003/0046554 A1 3/2003 Leydier et al.
2003/0048904 A1 3/2003 Wang et al.
2003/0050882 A1 3/2003 Degen et al.
2003/0057278 A1 3/2003 Wong
2003/0061163 A1 3/2003 Durfield
2003/0065563 A1 4/2003 Elliott et al.
2003/0070101 A1 4/2003 Buscemi
2003/0078877 A1 4/2003 Beirne et al.
2003/0093366 A1 5/2003 Halper et al.
2003/0097320 A1 5/2003 Gordon
2003/0105696 A1 6/2003 Kalotay et al.
2003/0115133 A1 6/2003 Bian
2003/0143980 A1 7/2003 Choi et al.
2003/0149744 A1 8/2003 Bierre et al.
2003/0153299 A1 8/2003 Perfit et al.
2003/0158751 A1 8/2003 Suresh et al.
2003/0158960 A1 8/2003 Engberg
2003/0182214 A1 9/2003 Taylor
2003/0195859 A1 10/2003 Lawrence
2003/0200447 A1 10/2003 Sjoblom
2003/0208428 A1 11/2003 Raynes et al.
2003/0222500 A1 12/2003 Bayeur et al.
2003/0225656 A1 12/2003 Aberman et al.
2003/0225692 A1 12/2003 Bosch et al.
2003/0225742 A1 12/2003 Tenner et al.
2003/0233278 A1 12/2003 Marshall
2004/0004117 A1 1/2004 Suzuki
2004/0005912 A1 1/2004 Hubbe et al.
2004/0010698 A1 1/2004 Rolfe

(56) References Cited

U.S. PATENT DOCUMENTS

2004/0024709 A1 2/2004 Yu et al.
2004/0026496 A1 2/2004 Zuili
2004/0030649 A1 2/2004 Nelson et al.
2004/0039586 A1 2/2004 Garvey et al.
2004/0054619 A1 3/2004 Watson et al.
2004/0059653 A1 3/2004 Verkuylen et al.
2004/0064401 A1 4/2004 Palaghita et al.
2004/0078324 A1 4/2004 Lonnberg et al.
2004/0103147 A1 5/2004 Flesher et al.
2004/0107363 A1 6/2004 Monteverde
2004/0110119 A1 6/2004 Riconda et al.
2004/0111305 A1 6/2004 Gavan et al.
2004/0111335 A1 6/2004 Black et al.
2004/0117235 A1 6/2004 Shacham
2004/0128227 A1 7/2004 Whipple et al.
2004/0128232 A1 7/2004 Descloux
2004/0133440 A1 7/2004 Carolan et al.
2004/0143526 A1 7/2004 Monasterio et al.
2004/0149820 A1 8/2004 Zuili
2004/0149827 A1 8/2004 Zuili
2004/0153330 A1 8/2004 Miller et al.
2004/0153656 A1 8/2004 Cluts et al.
2004/0158520 A1 8/2004 Noh
2004/0158523 A1 8/2004 Dort
2004/0158723 A1 8/2004 Root
2004/0167793 A1 8/2004 Masuoka et al.
2004/0177046 A1 9/2004 Ogram
2004/0193538 A1 9/2004 Raines
2004/0199456 A1 10/2004 Flint et al.
2004/0199462 A1 10/2004 Starrs
2004/0204948 A1 10/2004 Singletary et al.
2004/0205008 A1 10/2004 Haynie et al.
2004/0225594 A1 11/2004 Nolan, III et al.
2004/0230448 A1 11/2004 Schaich
2004/0230527 A1 11/2004 Hansen et al.
2004/0230538 A1 11/2004 Clifton et al.
2004/0234117 A1 11/2004 Tibor
2004/0243514 A1 12/2004 Wankmueller
2004/0243518 A1 12/2004 Clifton et al.
2004/0243567 A1 12/2004 Levy
2004/0250085 A1 12/2004 Tattan et al.
2004/0255127 A1 12/2004 Arnouse
2004/0260922 A1 12/2004 Goodman et al.
2005/0001028 A1 1/2005 Zuili
2005/0010513 A1 1/2005 Duckworth et al.
2005/0010780 A1 1/2005 Kane et al.
2005/0021519 A1 1/2005 Ghouri
2005/0027983 A1 2/2005 Klawon
2005/0038726 A1 2/2005 Salomon et al.
2005/0038737 A1 2/2005 Norris
2005/0039086 A1 2/2005 Krishnamurthy et al.
2005/0050577 A1 3/2005 Westbrook et al.
2005/0058262 A1 3/2005 Timmins et al.
2005/0065950 A1 3/2005 Chaganti et al.
2005/0071282 A1 3/2005 Lu et al.
2005/0075985 A1 4/2005 Cartmell
2005/0081052 A1 4/2005 Washington
2005/0086161 A1 4/2005 Gallant
2005/0091164 A1 4/2005 Varble
2005/0097039 A1 5/2005 Kulcsar et al.
2005/0097051 A1 5/2005 Madill, Jr. et al.
2005/0097364 A1 5/2005 Edeki et al.
2005/0102206 A1 5/2005 Savasoglu et al.
2005/0105719 A1 5/2005 Huda
2005/0125226 A1 6/2005 Magee
2005/0125686 A1 6/2005 Brandt
2005/0138391 A1 6/2005 Mandalia et al.
2005/0144143 A1 6/2005 Freiberg
2005/0154664 A1 7/2005 Guy et al.
2005/0154665 A1 7/2005 Kerr
2005/0154671 A1 7/2005 Doan et al.
2005/0165667 A1 7/2005 Cox
2005/0197953 A1 9/2005 Broadbent et al.
2005/0203885 A1 9/2005 Chenevich et al.
2005/0216953 A1 9/2005 Ellingson
2005/0229007 A1 10/2005 Bolle et al.
2005/0240578 A1 10/2005 Biederman et al.
2005/0242173 A1 11/2005 Suzuki
2005/0251474 A1 11/2005 Shinn et al.
2005/0256809 A1 11/2005 Sadri
2005/0262014 A1 11/2005 Fickes
2005/0273333 A1 12/2005 Morin et al.
2005/0278542 A1 12/2005 Pierson et al.
2005/0278786 A1 12/2005 Tippett
2005/0279827 A1 12/2005 Mascavage et al.
2005/0279869 A1 12/2005 Barklage
2006/0004663 A1 1/2006 Singhal
2006/0014129 A1 1/2006 Coleman et al.
2006/0032909 A1 2/2006 Seegar
2006/0041464 A1 2/2006 Powers et al.
2006/0045105 A1 3/2006 Dobosz et al.
2006/0047605 A1 3/2006 Ahmad
2006/0059073 A1 3/2006 Walzak
2006/0059110 A1 3/2006 Madhok et al.
2006/0064374 A1 3/2006 Helsper et al.
2006/0074798 A1 4/2006 Din et al.
2006/0074986 A1 4/2006 Mallalieu et al.
2006/0080230 A1 4/2006 Freiberg
2006/0080263 A1 4/2006 Willis et al.
2006/0089905 A1 4/2006 Song et al.
2006/0101508 A1 5/2006 Taylor
2006/0106605 A1 5/2006 Saunders et al.
2006/0112279 A1 5/2006 Cohen et al.
2006/0112280 A1 5/2006 Cohen et al.
2006/0129428 A1 6/2006 Wennberg
2006/0129481 A1 6/2006 Bhatt et al.
2006/0129840 A1 6/2006 Milgramm et al.
2006/0131390 A1 6/2006 Kim
2006/0136332 A1 6/2006 Ziegler
2006/0140460 A1 6/2006 Coutts
2006/0143073 A1 6/2006 Engel et al.
2006/0144924 A1 7/2006 Stover
2006/0149580 A1 7/2006 Helsper et al.
2006/0149674 A1 7/2006 Cook et al.
2006/0161435 A1 7/2006 Atef et al.
2006/0161592 A1 7/2006 Ertoz et al.
2006/0173776 A1 8/2006 Shalley et al.
2006/0173792 A1 8/2006 Glass
2006/0177226 A1 8/2006 Ellis, III
2006/0178971 A1 8/2006 Owen et al.
2006/0179004 A1 8/2006 Fuchs
2006/0195351 A1 8/2006 Bayburtian
2006/0200855 A1 9/2006 Willis
2006/0202012 A1 9/2006 Grano et al.
2006/0204051 A1 9/2006 Holland, IV
2006/0206725 A1 9/2006 Milgramm et al.
2006/0212386 A1 9/2006 Willey et al.
2006/0218069 A1 9/2006 Aberman et al.
2006/0229961 A1 10/2006 Lyftogt et al.
2006/0239512 A1 10/2006 Petrillo
2006/0239513 A1 10/2006 Song et al.
2006/0242046 A1 10/2006 Haggerty et al.
2006/0242047 A1 10/2006 Haggerty et al.
2006/0253358 A1 11/2006 Delgrosso et al.
2006/0253583 A1 11/2006 Dixon et al.
2006/0255914 A1 11/2006 Westman
2006/0262929 A1 11/2006 Vatanen et al.
2006/0265243 A1 11/2006 Racho et al.
2006/0271456 A1 11/2006 Romain et al.
2006/0271457 A1 11/2006 Romain et al.
2006/0271633 A1 11/2006 Adler
2006/0273158 A1 12/2006 Suzuki
2006/0277043 A1 12/2006 Tomes et al.
2006/0282285 A1 12/2006 Helsper et al.
2006/0282372 A1 12/2006 Endres et al.
2006/0282395 A1 12/2006 Leibowitz
2006/0287765 A1 12/2006 Kraft
2006/0288090 A1 12/2006 Kraft
2006/0294023 A1 12/2006 Lu
2007/0005508 A1 1/2007 Chiang
2007/0011100 A1 1/2007 Libin et al.
2007/0016500 A1 1/2007 Chatterji et al.
2007/0016521 A1 1/2007 Wang
2007/0016522 A1 1/2007 Wang

(56) References Cited

U.S. PATENT DOCUMENTS

2007/0022141 A1 1/2007 Singleton et al.
2007/0038483 A1 2/2007 Wood
2007/0038568 A1 2/2007 Greene et al.
2007/0040017 A1 2/2007 Kozlay
2007/0040019 A1 2/2007 Berghel et al.
2007/0043577 A1 2/2007 Kasower
2007/0047770 A1 3/2007 Swope et al.
2007/0048765 A1 3/2007 Abramson
2007/0050638 A1 3/2007 Rasti
2007/0059442 A1 3/2007 Sabeta
2007/0061273 A1 3/2007 Greene et al.
2007/0067207 A1 3/2007 Haggerty et al.
2007/0067297 A1 3/2007 Kublickis
2007/0072190 A1 3/2007 Aggarwal
2007/0073622 A1 3/2007 Kane
2007/0073630 A1 3/2007 Greene et al.
2007/0078786 A1 4/2007 Bous et al.
2007/0078908 A1 4/2007 Rohatgi et al.
2007/0078985 A1 4/2007 Shao et al.
2007/0083460 A1 4/2007 Bachenheimer
2007/0087795 A1 4/2007 Aletto et al.
2007/0093234 A1 4/2007 Willis et al.
2007/0094137 A1 4/2007 Phillips et al.
2007/0094264 A1 4/2007 Nair
2007/0100774 A1 5/2007 Abdon
2007/0106582 A1 5/2007 Baker et al.
2007/0106611 A1 5/2007 Larsen
2007/0107050 A1 5/2007 Selvarajan
2007/0109103 A1 5/2007 Jedrey et al.
2007/0110282 A1 5/2007 Millsapp
2007/0112667 A1 5/2007 Rucker
2007/0112668 A1 5/2007 Celano et al.
2007/0118393 A1 5/2007 Rosen et al.
2007/0155411 A1 7/2007 Morrison
2007/0157299 A1 7/2007 Hare
2007/0168246 A1 7/2007 Haggerty et al.
2007/0168480 A1 7/2007 Biggs et al.
2007/0174208 A1 7/2007 Black et al.
2007/0179903 A1 8/2007 Seinfeld et al.
2007/0180209 A1 8/2007 Tallman
2007/0180263 A1 8/2007 Delgrosso et al.
2007/0186276 A1 8/2007 McRae et al.
2007/0192248 A1 8/2007 West
2007/0192853 A1 8/2007 Shraim et al.
2007/0198410 A1 8/2007 Labgold et al.
2007/0205266 A1 9/2007 Carr et al.
2007/0208669 A1 9/2007 Rivette et al.
2007/0214037 A1 9/2007 Shubert et al.
2007/0214365 A1 9/2007 Cornett et al.
2007/0219928 A1 9/2007 Madhogarhia
2007/0220594 A1 9/2007 Tulsyan
2007/0226093 A1 9/2007 Chan et al.
2007/0226129 A1 9/2007 Liao et al.
2007/0233614 A1 10/2007 McNelley et al.
2007/0234427 A1 10/2007 Gardner et al.
2007/0244782 A1 10/2007 Chimento
2007/0244807 A1 10/2007 Andringa et al.
2007/0250704 A1 10/2007 Hallam-Baker
2007/0250920 A1 10/2007 Lindsay
2007/0266439 A1 11/2007 Kraft
2007/0282730 A1 12/2007 Carpenter et al.
2007/0288355 A1 12/2007 Roland et al.
2007/0288360 A1 12/2007 Seeklus
2007/0288559 A1 12/2007 Parsadayan
2007/0291995 A1 12/2007 Rivera
2007/0292006 A1 12/2007 Johnson
2007/0294104 A1 12/2007 Boaz et al.
2007/0299759 A1 12/2007 Kelly
2008/0010203 A1 1/2008 Grant
2008/0010683 A1 1/2008 Baddour et al.
2008/0010687 A1 1/2008 Gonen et al.
2008/0015887 A1 1/2008 Drabek et al.
2008/0021804 A1 1/2008 Deckoff
2008/0027857 A1 1/2008 Benson
2008/0027858 A1 1/2008 Benson
2008/0052182 A1 2/2008 Marshall
2008/0059236 A1 3/2008 Cartier
2008/0059352 A1 3/2008 Chandran
2008/0059364 A1 3/2008 Tidwell et al.
2008/0059366 A1 3/2008 Fou
2008/0063172 A1 3/2008 Ahuja et al.
2008/0066188 A1 3/2008 Kwak
2008/0071882 A1 3/2008 Hering et al.
2008/0076386 A1 3/2008 Khetawat et al.
2008/0077526 A1 3/2008 Arumugam
2008/0098222 A1 4/2008 Zilberman
2008/0103798 A1 5/2008 Domenikos et al.
2008/0103800 A1 5/2008 Domenikos et al.
2008/0103811 A1 5/2008 Sosa
2008/0103972 A1 5/2008 Lanc
2008/0104021 A1 5/2008 Cai et al.
2008/0104672 A1 5/2008 Lunde et al.
2008/0114837 A1 5/2008 Biggs et al.
2008/0120237 A1 5/2008 Lin
2008/0126116 A1 5/2008 Singhai
2008/0126233 A1 5/2008 Hogan
2008/0147454 A1 6/2008 Walker et al.
2008/0154758 A1 6/2008 Schattmaier et al.
2008/0162202 A1 7/2008 Khanna et al.
2008/0162259 A1 7/2008 Patil et al.
2008/0162383 A1 7/2008 Kraft
2008/0167883 A1 7/2008 Thavildar Khazaneh
2008/0175360 A1 7/2008 Schwarz et al.
2008/0177655 A1 7/2008 Zalik
2008/0177841 A1 7/2008 Sinn et al.
2008/0189789 A1 8/2008 Lamontagne
2008/0208548 A1 8/2008 Metzger et al.
2008/0208610 A1 8/2008 Thomas et al.
2008/0208726 A1 8/2008 Tsantes et al.
2008/0217400 A1 9/2008 Portano
2008/0228635 A1 9/2008 Megdal et al.
2008/0243680 A1 10/2008 Megdal et al.
2008/0244717 A1 10/2008 Jelatis et al.
2008/0255922 A1 10/2008 Feldman et al.
2008/0255992 A1 10/2008 Lin
2008/0256613 A1 10/2008 Grover
2008/0281737 A1 11/2008 Fajardo
2008/0281743 A1 11/2008 Pettit
2008/0288382 A1 11/2008 Smith et al.
2008/0288430 A1 11/2008 Friedlander et al.
2008/0288790 A1 11/2008 Wilson
2008/0294540 A1 11/2008 Celka et al.
2008/0294689 A1 11/2008 Metzger et al.
2008/0296367 A1 12/2008 Parkinson
2008/0296382 A1 12/2008 Connell, II et al.
2008/0300877 A1 12/2008 Gilbert et al.
2008/0319889 A1 12/2008 Hammad
2009/0007220 A1 1/2009 Ormazabal et al.
2009/0018934 A1 1/2009 Peng et al.
2009/0021349 A1 1/2009 Errico et al.
2009/0024417 A1 1/2009 Marks et al.
2009/0024505 A1 1/2009 Patel et al.
2009/0024636 A1 1/2009 Shiloh
2009/0024663 A1 1/2009 McGovern
2009/0026270 A1 1/2009 Connell, II et al.
2009/0043637 A1 2/2009 Eder
2009/0044279 A1 2/2009 Crawford et al.
2009/0048957 A1 2/2009 Celano
2009/0079539 A1 3/2009 Johnson
2009/0094311 A1 4/2009 Awadallah et al.
2009/0099960 A1 4/2009 Robida et al.
2009/0106153 A1 4/2009 Ezra
2009/0106846 A1 4/2009 Dupray et al.
2009/0112650 A1 4/2009 Iwane
2009/0119106 A1 5/2009 Rajakumar et al.
2009/0119299 A1 5/2009 Rhodes
2009/0125369 A1 5/2009 Kloostra et al.
2009/0125439 A1 5/2009 Zarikian et al.
2009/0125463 A1 5/2009 Hido
2009/0138391 A1 5/2009 Dudley et al.
2009/0141318 A1 6/2009 Hughes
2009/0151005 A1 6/2009 Bell et al.
2009/0158404 A1 6/2009 Hahn et al.
2009/0164380 A1 6/2009 Brown

(56) References Cited

U.S. PATENT DOCUMENTS

2009/0172815 A1 7/2009 Gu et al.
2009/0182653 A1 7/2009 Zimiles
2009/0199264 A1 8/2009 Lang
2009/0205032 A1 8/2009 Hinton et al.
2009/0206993 A1 8/2009 Di Mambro et al.
2009/0216560 A1 8/2009 Siegel
2009/0216747 A1 8/2009 Li et al.
2009/0222308 A1 9/2009 Zoldi et al.
2009/0222362 A1 9/2009 Stood et al.
2009/0222369 A1* 9/2009 Zoldi ................ G06Q 20/4016 705/35
2009/0222373 A1 9/2009 Choudhuri et al.
2009/0222374 A1 9/2009 Choudhuri et al.
2009/0222375 A1 9/2009 Choudhuri et al.
2009/0222376 A1 9/2009 Choudhuri et al.
2009/0222377 A1 9/2009 Choudhuri et al.
2009/0222378 A1 9/2009 Choudhuri et al.
2009/0222379 A1 9/2009 Choudhuri et al.
2009/0222380 A1 9/2009 Choudhuri et al.
2009/0222897 A1 9/2009 Carow et al.
2009/0224875 A1 9/2009 Rabinowitz et al.
2009/0224889 A1 9/2009 Aggarwal et al.
2009/0226056 A1 9/2009 Vlachos et al.
2009/0234738 A1 9/2009 Britton et al.
2009/0240609 A1 9/2009 Cho et al.
2009/0241168 A1 9/2009 Readshaw
2009/0241173 A1 9/2009 Troyansky
2009/0248198 A1 10/2009 Siegel et al.
2009/0248497 A1 10/2009 Hueter
2009/0248567 A1 10/2009 Haggerty et al.
2009/0248568 A1 10/2009 Haggerty et al.
2009/0248569 A1 10/2009 Haggerty et al.
2009/0248570 A1 10/2009 Haggerty et al.
2009/0248571 A1 10/2009 Haggerty et al.
2009/0248572 A1 10/2009 Haggerty et al.
2009/0248573 A1 10/2009 Haggerty et al.
2009/0254476 A1 10/2009 Sharma et al.
2009/0254484 A1 10/2009 Forero et al.
2009/0257595 A1 10/2009 de Cesare et al.
2009/0259470 A1 10/2009 Chang
2009/0259560 A1 10/2009 Bachenheimer
2009/0259588 A1 10/2009 Lindsay
2009/0259855 A1 10/2009 de Cesare et al.
2009/0261189 A1 10/2009 Ellis, Jr.
2009/0270126 A1 10/2009 Liu
2009/0271265 A1 10/2009 Lay et al.
2009/0271617 A1 10/2009 Song et al.
2009/0272801 A1 11/2009 Connell, II et al.
2009/0276244 A1 11/2009 Baldwin, Jr. et al.
2009/0281945 A1 11/2009 Shakkarwar
2009/0281951 A1 11/2009 Shakkarwar
2009/0289110 A1 11/2009 Regen et al.
2009/0292568 A1 11/2009 Khosravani et al.
2009/0300066 A1 12/2009 Guo et al.
2009/0307778 A1 12/2009 Mardikar
2009/0326972 A1 12/2009 Washington
2009/0328173 A1 12/2009 Jakobson et al.
2010/0024037 A1 1/2010 Grzymala-Busse et al.
2010/0030677 A1 2/2010 Melik-Aslanian et al.
2010/0031030 A1 2/2010 Kao et al.
2010/0037147 A1 2/2010 Champion et al.
2010/0037308 A1 2/2010 Lin et al.
2010/0042526 A1 2/2010 Martinov
2010/0043055 A1 2/2010 Baumgart
2010/0070620 A1 3/2010 Awadallah et al.
2010/0077006 A1 3/2010 El Emam et al.
2010/0085146 A1 4/2010 Johnson
2010/0088233 A1 4/2010 Tattan et al.
2010/0088338 A1 4/2010 Pavoni, Jr. et al.
2010/0094664 A1 4/2010 Bush et al.
2010/0094767 A1 4/2010 Miltonberger
2010/0094768 A1 4/2010 Miltonberger
2010/0094910 A1 4/2010 Bayliss
2010/0095357 A1 4/2010 Willis et al.
2010/0100406 A1 4/2010 Lim
2010/0100945 A1 4/2010 Ozzie et al.
2010/0107225 A1 4/2010 Spencer et al.
2010/0114724 A1 5/2010 Ghosh et al.
2010/0114744 A1 5/2010 Gonen
2010/0121767 A1 5/2010 Coulter et al.
2010/0130172 A1 5/2010 Vendrow et al.
2010/0131273 A1 5/2010 Aley-Raz et al.
2010/0132043 A1 5/2010 Bjorn et al.
2010/0145836 A1 6/2010 Baker et al.
2010/0158207 A1 6/2010 Dhawan et al.
2010/0169210 A1 7/2010 Bous et al.
2010/0169947 A1 7/2010 Sarmah et al.
2010/0188684 A1 7/2010 Kumara
2010/0205662 A1 8/2010 Ibrahim et al.
2010/0217837 A1 8/2010 Ansari et al.
2010/0218255 A1 8/2010 Ritman et al.
2010/0228649 A1 9/2010 Pettitt
2010/0228657 A1 9/2010 Kagarlis
2010/0229225 A1 9/2010 Sarmah et al.
2010/0229230 A1 9/2010 Edeki et al.
2010/0229245 A1 9/2010 Singhal
2010/0241501 A1 9/2010 Marshall
2010/0250364 A1 9/2010 Song et al.
2010/0250411 A1 9/2010 Ogrodski
2010/0250509 A1 9/2010 Andersen
2010/0250955 A1 9/2010 Trevithick et al.
2010/0268557 A1 10/2010 Faith et al.
2010/0274679 A1 10/2010 Hammad
2010/0275265 A1 10/2010 Fiske et al.
2010/0280882 A1 11/2010 Faith et al.
2010/0281248 A1 11/2010 Lockhart et al.
2010/0293090 A1 11/2010 Domenikos et al.
2010/0293114 A1 11/2010 Khan et al.
2010/0302157 A1 12/2010 Zilberman
2010/0305993 A1* 12/2010 Fisher .................... G06Q 40/00 706/47
2010/0306101 A1 12/2010 Lefner et al.
2010/0313273 A1 12/2010 Freas
2010/0325035 A1 12/2010 Hilgers et al.
2010/0325442 A1 12/2010 Petrone et al.
2010/0332292 A1 12/2010 Anderson
2010/0332362 A1 12/2010 Ramsey et al.
2011/0004498 A1 1/2011 Readshaw
2011/0016042 A1 1/2011 Cho et al.
2011/0040983 A1 2/2011 Grzymala-Busse et al.
2011/0047071 A1 2/2011 Choudhuri et al.
2011/0066547 A1 3/2011 Clark et al.
2011/0093383 A1 4/2011 Haggerty et al.
2011/0112958 A1 5/2011 Haggerty et al.
2011/0119291 A1 5/2011 Rice
2011/0126024 A1 5/2011 Beatson et al.
2011/0126275 A1 5/2011 Anderson et al.
2011/0131123 A1 6/2011 Griffin et al.
2011/0145899 A1 6/2011 Cao et al.
2011/0166988 A1 7/2011 Coulter
2011/0184838 A1 7/2011 Winters et al.
2011/0184851 A1 7/2011 Megdal et al.
2011/0196791 A1 8/2011 Dominguez
2011/0238566 A1 9/2011 Santos
2011/0260832 A1 10/2011 Ross et al.
2011/0276496 A1 11/2011 Neville et al.
2011/0282778 A1 11/2011 Wright et al.
2011/0289032 A1 11/2011 Crooks et al.
2011/0289322 A1 11/2011 Rasti
2011/0295721 A1 12/2011 MacDonald
2011/0295750 A1 12/2011 Rammal
2011/0296529 A1 12/2011 Bhanoo et al.
2011/0302412 A1 12/2011 Deng et al.
2011/0302641 A1 12/2011 Hald et al.
2012/0030080 A1 2/2012 Slater et al.
2012/0030771 A1 2/2012 Pierson et al.
2012/0036352 A1 2/2012 Tovar et al.
2012/0066073 A1 3/2012 Dilip et al.
2012/0101939 A1 4/2012 Kasower
2012/0158574 A1 6/2012 Brunzell et al.
2012/0158654 A1 6/2012 Behren et al.
2012/0198556 A1 8/2012 Patel et al.
2012/0215682 A1 8/2012 Lent et al.
2012/0278227 A1 11/2012 Kolo et al.

(56) References Cited

U.S. PATENT DOCUMENTS

2012/0278249 A1 11/2012 Duggal et al.
2012/0290660 A1 11/2012 Rao et al.
2013/0004033 A1 1/2013 Trugenberger et al.
2013/0132060 A1 5/2013 Badhe et al.
2013/0185293 A1 7/2013 Boback
2013/0218797 A1 8/2013 Prichard et al.
2014/0007238 A1 1/2014 Magee et al.
2014/0058910 A1 2/2014 Abeles
2014/0143134 A1 5/2014 Yan
2014/0149304 A1 5/2014 Bucholz et al.
2014/0180883 A1 6/2014 Regan
2014/0214636 A1 7/2014 Rajsky
2014/0283097 A1 9/2014 Allen et al.
2014/0304822 A1 10/2014 Sher-Jan et al.
2015/0033297 A1 1/2015 Sanso et al.
2015/0106260 A1 4/2015 Andrews et al.
2015/0142595 A1 5/2015 Acuña-Rohter
2015/0161529 A1 6/2015 Kondaji et al.
2015/0186901 A1 7/2015 Miltonberger
2015/0199784 A1 7/2015 Straub et al.
2015/0205692 A1 7/2015 Seto
2015/0295924 A1 10/2015 Gottschalk, Jr.
2015/0348036 A1 12/2015 Nordyke et al.
2015/0348208 A1 12/2015 Nordyke et al.
2016/0012561 A1 1/2016 Lappenbusch et al.
2016/0063278 A1 3/2016 Kraska et al.
2016/0063634 A1 3/2016 Calibey
2016/0063645 A1 3/2016 Houseworth et al.
2016/0071208 A1 3/2016 Straub et al.
2016/0086262 A1 3/2016 Straub et al.
2016/0125412 A1 5/2016 Cannon
2016/0142532 A1 5/2016 Bostick
2016/0210450 A1 7/2016 Su
2016/0328814 A1 11/2016 Prichard et al.
2016/0344758 A1 11/2016 Cohen et al.
2016/0379011 A1 12/2016 Koike et al.
2017/0032463 A1* 2/2017 Hunter .................. G06F 16/285
2017/0099314 A1 4/2017 Klatt et al.
2017/0161520 A1 6/2017 Lockhart, III
2017/0161746 A1 6/2017 Cook
2017/0177683 A1 6/2017 Koike et al.
2017/0206376 A1 7/2017 Sher-Jan
2017/0270629 A1 9/2017 Fitzgerald
2017/0278182 A1 9/2017 Kasower
2017/0331839 A1 11/2017 Park et al.
2017/0357971 A1 12/2017 Pitz et al.
2017/0374076 A1 12/2017 Pierson et al.
2018/0004978 A1 1/2018 Hebert et al.
2018/0013786 A1 1/2018 Knopf
2018/0027001 A1 1/2018 Park et al.
2018/0033009 A1 2/2018 Goldman et al.
2018/0131708 A1 5/2018 Pirttilahti et al.
2018/0184288 A1 6/2018 De Lorenzo et al.
2018/0210933 A1* 7/2018 Dean ..................... G06F 16/254
2018/0218369 A1 8/2018 Xiao et al.
2018/0322572 A1 11/2018 Straub et al.
2019/0073676 A1 3/2019 Wang
2019/0164173 A1 5/2019 Liu et al.
2019/0228178 A1 7/2019 Sharma et al.
2019/0266609 A1 8/2019 Phelan et al.
2019/0294786 A1 9/2019 Villavicencio et al.
2019/0311366 A1 10/2019 Zoldi et al.
2019/0333101 A1 10/2019 Sohum et al.
2019/0349351 A1 11/2019 Verma et al.
2019/0354982 A1 11/2019 Gómez
2019/0377896 A1 12/2019 Spinelli et al.
2019/0385170 A1 12/2019 Arrabothu et al.
2020/0005310 A1 1/2020 Kumar et al.
2020/0110870 A1 4/2020 Girdhar
2020/0134629 A1 4/2020 Zoldi et al.
2020/0143465 A1 5/2020 Chilaka et al.
2020/0145436 A1 5/2020 Brown et al.
2020/0151628 A1 5/2020 Zoldi et al.
2020/0193018 A1 6/2020 Van Dyke
2020/0242615 A1 7/2020 Chandra et al.
2020/0273097 A1 8/2020 Nordyke et al.
2020/0293684 A1 9/2020 Harris et al.
2020/0380112 A1 12/2020 Allen
2020/0396246 A1 12/2020 Zoldi et al.
2021/0021631 A1 1/2021 Okutan et al.
2021/0150056 A1 5/2021 Vax
2021/0150532 A1 5/2021 Zhang et al.
2021/0182857 A1 6/2021 Tiwan
2021/0182874 A1* 6/2021 Gurnov .................... G06N 3/08
2021/0209230 A1 7/2021 Leitner et al.
2021/0326785 A1 10/2021 McBurnett et al.
2021/0372314 A1 12/2021 Weigl et al.
2022/0038481 A1 2/2022 Jones
2022/0046088 A1 2/2022 Knopf
2022/0084032 A1 3/2022 Koehler et al.
2022/0103589 A1 3/2022 Shen et al.
2022/0123946 A1 4/2022 Knopf
2022/0147817 A1 5/2022 Boardman et al.
2022/0180368 A1 6/2022 Immaneni
2022/0207324 A1 6/2022 Hamilton et al.
2022/0231859 A1 7/2022 Knopf et al.
2022/0277308 A1 9/2022 Ardizzi et al.
2022/0321394 A1 10/2022 Huang et al.
2022/0327541 A1 10/2022 Seguritan
2022/0358516 A1 11/2022 Zoldi et al.
2022/0368704 A1 11/2022 Brown et al.
2022/0377096 A1 11/2022 Johnston et al.
2022/0391793 A1 12/2022 Latimer et al.
2022/0400087 A1 12/2022 Hoover et al.
2022/0417275 A1 12/2022 Jones
2023/0008975 A1 1/2023 Crudele
2023/0035336 A1 2/2023 Knopf
2023/0046601 A1 2/2023 Hamilton et al.
2023/0082708 A1 3/2023 Hoover et al.
2023/0113118 A1 4/2023 Guo et al.
2023/0162053 A1 5/2023 Patel et al.
2023/0196147 A1 6/2023 McBurnett et al.
2023/0196455 A1 6/2023 Huber et al.
2023/0205893 A1 6/2023 Gjorvad et al.
2023/0216866 A1 7/2023 Monnig et al.
2023/0229767 A1 7/2023 Galli et al.
2023/0245139 A1 8/2023 Shen et al.
2023/0245246 A1 8/2023 Stack et al.
2023/0254333 A1 8/2023 Johnston et al.
2023/0267537 A1 8/2023 Nordyke et al.
2023/0283628 A1 9/2023 Johnston
2023/0342605 A1 10/2023 Sankaran et al.
2023/0362014 A1 11/2023 Knopf
2023/0388131 A1 11/2023 Knopf
2023/0403276 A1 12/2023 Vbh et al.
2024/0022587 A1 1/2024 Jones

FOREIGN PATENT DOCUMENTS

AU 2020419017 6/2023
AU 2023203214 6/2023
AU 2022291564 7/2023
CA 3 058 653 4/2020
CN 104877993 9/2015
CN 113011973 6/2021
DE 91 08 341 10/1991
EP 0 554 083 8/1993
EP 2 939 361 10/2019
EP 3 092 569 1/2024
GB 2 392 748 3/2004
GB 2 518 099 3/2015
JP 2011-134252 7/2011
JP 5191376 5/2013
KR 10-2004-0034063 4/2004
TW I256569 6/2006
WO WO 94/006103 3/1994
WO WO 96/041488 12/1996
WO WO 00/055778 9/2000
WO WO 00/055789 9/2000
WO WO 00/055790 9/2000
WO WO 01/011522 2/2001
WO WO 02/027610 4/2002
WO WO 02/097563 12/2002
WO WO 03/071388 8/2003

(56) References Cited

FOREIGN PATENT DOCUMENTS

| | | |
|---|---|---|
| WO | WO 02/037219 A9 | 5/2004 |
| WO | WO 2004/046882 | 6/2004 |
| WO | WO 2006/069199 | 6/2006 |
| WO | WO 2007/001394 | 1/2007 |
| WO | WO 2008/028179 | 3/2008 |
| WO | WO 2008/054403 | 5/2008 |
| WO | WO 2008/054849 | 5/2008 |
| WO | WO 2008/147918 | 12/2008 |
| WO | WO 2009/062111 | 5/2009 |
| WO | WO 2009/117518 | 9/2009 |
| WO | WO 2011/044036 | 4/2011 |
| WO | WO 2012/054646 | 4/2012 |
| WO | WO 2012/112781 | 8/2012 |
| WO | WO 2013/026343 | 2/2013 |
| WO | WO 2013/126281 | 8/2013 |
| WO | WO 2014/008079 | 1/2014 |
| WO | WO 2014/008247 | 1/2014 |
| WO | WO 2014/150987 | 9/2014 |
| WO | WO 2015/184006 | 12/2015 |
| WO | WO 2017/011345 | 1/2017 |
| WO | WO 2018/163162 | 9/2018 |
| WO | WO 2018/175440 | 9/2018 |
| WO | WO 2018/208770 | 11/2018 |
| WO | WO 2019/006272 | 1/2019 |
| WO | WO 2019/018420 | 1/2019 |
| WO | WO 2019/040443 | 2/2019 |
| WO | WO 2019/050864 | 3/2019 |
| WO | WO 2019/079071 | 4/2019 |
| WO | WO 2019/125445 | 6/2019 |
| WO | WO 2019/169000 | 9/2019 |
| WO | WO 2022/020162 | 1/2022 |
| WO | WO 2022/026273 | 2/2022 |
| WO | WO 2022/031412 | 2/2022 |
| WO | WO 2022/032285 | 2/2022 |
| WO | WO 2022/072989 | 4/2022 |
| WO | WO 2022/104329 | 5/2022 |
| WO | WO 2022/221202 | 10/2022 |
| WO | WO 2022/261600 | 12/2022 |
| WO | WO 2023/060150 | 4/2023 |
| WO | WO 2023/086954 | 5/2023 |
| WO | WO 2023/107134 | 6/2023 |
| WO | WO 2023/129977 | 7/2023 |

OTHER PUBLICATIONS

U.S. Appl. No. 09/557,252 filed Apr. 24, 2000, Page.
U.S. Appl. No. 12/705,489, filed Feb. 12, 2010, Bargoli et al.
U.S. Appl. No. 12/705,511, filed Feb. 12, 2010, Bargoli et al.
Chatzigeorgiou et al., "A Communication Gateway Architecture for Ensuring Privacy and Confidentiality in Incident Reporting," 2017 IEEE 15th International Conference on Software Engineering Research, Management and Applications (SERA), London, UK, 2017, pp. 407-411.
Chen et al., "Statistical Analysis of Identity Risk of Exposure and Cost Using the Ecosystem of Identity Attributes," 2019 European Intelligence and Security Informatics Conference (EISIC), Oulu, Finland, 2019, pp. 32-39.
International Preliminary Report on Patentability in Application No. PCT/US2022/024277, dated Oct. 26, 2023.
Li, "Threats and data trading detection methods in the dark web," 2021 6th International Conference on Innovative Technology in Intelligent System and Industrial Applications (CITISIA), Sydney, Australia, 2021, pp. 1-9.
Mahalle et al., "Insider Threat and Mitigation for Cloud Architecture Infrastructure in Banking and Financial Services Industry", Proceedings of the 2019 IEEE 23rd International Conference on Computer Supported Cooperative Work in Design, 2019, pp. 16-21.
Peterson et al., "Introduction to Identity Management Risk Metrics," in IEEE Security & Privacy, vol. 4, No. 4, Jul.-Aug. 2006, pp. 88-91.
Trabelsi, "Monitoring Leaked Confidential Data," 2019 10th IFIP International Conference on New Technologies, Mobility and Security (NTMS), Canary Islands, Spain, 2019, pp. 1-5.
Xu et al., "Research on Dark Web Monitoring Crawler Based on TOR," 2021 IEEE 2nd InternationalConference on Information Technology, Big Data and Artificial Intelligence (ICIBA), Chongqing, China, 2021, pp. 197-202.
"A New Approach to Fraud Solutions", BasePoint Science Solving Fraud, pp. 8, 2006.
Aad et al., "NRC Data Collection and the Privacy by Design Principles", IEEE, Nov. 2010, pp. 5.
Aïmeur et al., "The Scourge of Internet Personal Data Collection", 2013 International Conference on Availability, Reliability and Security, pp. 821-828.
Allard et al., "Safe Realization of the Generalization Privacy Mechanism", 2011 Ninth Annual International Conference on Privacy, Security and Trust, pp. 8.
"Arizona Company Has Found Key in Stopping ID Theft," PR Newswire, New York, Aug. 10, 2005 http://proquest.umi.com/pqdweb?did=880104711&SID=1&Fmt=3&clientId=19649&RQT=309&Vname=PQD.
ABC News Now:Money Matters, as broadcasted Nov. 15, 2005 with guest Todd Davis (CEO of Lifelock), pp. 6.
AlSalamah et al., "Security Risk Management in Online System", 2017 5th International Conference on Applied Computing and Information Technology/4th International Conference on Computational Science/Intelligence and Applied Informatics/2nd International Conference on Big Data, Cloud Computing, Data Science & Engineering, 2017, pp. 119-124.
Anonymous, "Feedback", Credit Management, ABI/INFORM Global, Sep. 2006, pp. 6.
"Beverly Hills Man Convicted of Operating 'Bust-Out' Schemes that Caused More than $8 Million in Losses", Department of Justice, Jul. 25, 2006, 2 Pgs.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
"Bust-Out Schemes", Visual Analytics Inc. Technical Product Support, Newsletter vol. 4, Issue 1, Jan. 2005, pp. 7.
Chores & Allowances, "Do Kids Have Credit Reports?" Oct. 15, 2007, http://choresandallowances.blogspot.com/2007/10/do-kids-have-credit-reports.html, pp. 5.
Cowie, Norman, "Warning Bells & 'The Bust-Out'", Business Credit, Jul. 1, 2000, pp. 5.
Cullen, Terri; "The Wall Street Journal Complete Identity Theft Guidebook:How to Protect Yourself from the Most Pervasive Crime in America"; Chapter 3, pp. 59-79; Jul. 10, 2007.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: a Planner's Guide to Identity Theft"; Journal of Financial Planning:Tech Talk; pp. 36-38; Sep. 2004.
"Dealing with Measurement Noise (A Gentle Introduction to Noise Filtering)", Chemical and Process Engineering, University of Newcastle Upon Tyne, https://web.archive.org/web/20000418021742/http://lorien.ncl.ac.uk/ming/filter/filewma.htm, Archived Apr. 18, 2000, pp. 3.
Dimopoulou et al., "Mobile Anonymization and Pseudonymization of Structured Health Data for Research," 2022 Seventh International Conference on Mobile and Secure Services (MobiSecServ), 2022, pp. 1-6.
EFunds Corporation, "Data & Decisioning: Debit Report" printed Apr. 1, 2007, http://www.efunds.com/web/industry-solutions/financial-services/frm-debit-report/htm in 1 page.
El Haddad et al., "Exploring User Behavior and Cybersecurity Knowledge—an Experimental Study in Online Shopping", 2018 16th Annual Conference on Privacy, Security and Trust (PST), pp. 10.
El Kalam et al., "Personal Data Anonymization for Security and Privacy in Collaborative Environments", 2005 IEEE, pp. 56-61.
Equifax; "Equifax Credit Watch"; https://web.archive.org/web/20070627135447/https://www.econsumer.equifax.co.uk/consumer/uk/sitepage.ehtml?forward=gb_esn_detail, dated Jun. 27, 2007 on www.archive.org in 2 pages.

(56) References Cited

OTHER PUBLICATIONS

Experian Team, "Impact on Credit Scores of Inquiries for an Auto Loan," Ask Experian, Mar. 1, 2009, pp. 5.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
"Fighting the New Face of Fraud", FinanceTech, http://www.financetech.com/showArticle.jhtml?articleID=167100405, Aug. 2, 2005.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
"Fraud Alert | Learn How". Fight Identity Theft. http://www.fightidentitytheft.com/flag.html, accessed on Nov. 5, 2009.
Gaudio, David, "Intelligent Adaptive Authentication: How 6 Workflow Steps Improve Customer Experience", OneSpan, https://www.onespan.com/blog/intelligent-adaptive-authentication-how-6-workflow-steps-improve-customer-experience, Jun. 22, 2020, pp. 6.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: a Critical National and Global Threat," LexisNexis, Oct. 28, 2003, pp. 1-48.
Haglund, Christoffer, "Two-Factor Authentication with a Mobile Phone", Fox Technologies, Uppsala, Department of Information Technology, Nov. 2, 2007, pp. 62.
Herzberg, Amir, "Payments and Banking with Mobile Personal Devices," Communications of the ACM, May 2003, vol. 46, No. 5, pp. 53-58.
Hu et al. "Robust Support Vector Machines for Anomaly Detection in Computer Security", 2003, Proceedings of the 2003 International Conference on Machine Learning and Applications, pp. 7.
"ID Analytics ID Network", from www.idanalytics.com, as retrieved from www.archive.org, dated Nov. 20, 2005 or earlier; attached as "ID Network (IDN)", pp. 8.
ID Cops, www.idcops.com; retrieved from www.archive.org any linkage Feb. 16, 2007.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus,Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—to Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&SID=1&Fmt=3&clientId=19649&RQT=309&Vname=PQD.
"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection"http://web.archive.org/web/20080706135451/http://iboainfo.com/child-order.html as archived Jul. 6, 2008 in 1 page.
Information Brokers of America, "Safeguard Your Child's Credit",http://web.archive.org/web/20071215210406/http://www.iboainfo.com/child-id-protect.html as archived Dec. 15, 2007 in 1 page.
"Intersections, Inc. Identity Guard", from www.intersections.com and www.identityguard.com, as retrieved from Internet Archive, dated Nov. 25, 2005 or earlier; attached as "Identity Guard (IDG)", pp. 7.
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Jaeger, Herbert, "A Tutorial on Training Recurrent Neural Networks, Covering BPPT, RTRL, EKF and the 'Echo State Network' Approach", Fraunhofer Institute for Autonomous Intelligent Systems (AIS), International University Bremen, Oct. 2002, pp. 46.
Jin et al., "Network Security Risks in Online Banking", 2005 International Conference on Wireless Communications, Networking and Mobile Computing, Jan. 2005, vol. 2, pp. 1229-1234.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Kundu et al., "BLAST-SSAHA Hybridization for Credit Card Fraud Detection", Oct.-Dec. 2009, IEEE Transactions on Dependable and Secure Computing, vol. 6, No. 4, pp. 309-315.
Lamons, Bob, "Be Smart: Offer Inquiry Qualification Services," Marketing News, ABI/Inform Global, Nov. 6, 1995, vol. 29, No. 23, pp. 13.
Lee, Timothy B., "How America's Broken Tax System Makes Identity Theft Easy", http://www.vox.com/2014/4/14/5608072/how-americas-broken-tax-system-makes-identity-theft-easy, Apr. 14, 2014, pp. 10.
Lee, W.A.; "Experian, on Deal Hunt, Nets Identity Theft Insurer", American Banker: the Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
Lennox et al., "Tax Aggressiveness and Accounting Fraud", Journal of Accounting Research, 2013, pp. 40.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
National Alert Registry Launches RegisteredOffendersList.org to Provide Information on Registered Sex Offenders, May 16, 2005, pp. 2, http://www.prweb.com/printer/240437.htm accessed on Oct. 18, 2011.

(56) References Cited

OTHER PUBLICATIONS

National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com,http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: an Institutional Investor Perspective, Council of Institutional Investors, Apr. 2009, pp. 21.
Pervushin et al., "Determination of loss of information during data anonymization procedure," 2016 IEEE 10th International Conference on Application of Information and Communication Technologies (AICT), 2016, pp. 1-5.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Quinn, Tom, "Low Credit Inquiries Affect Your Credit Score", Credit.com, May 2, 2011, pp. 2.
"Recurrent Neural Network", as downloaded from wikipedia.org <https://en.wikipedia.org/wiki/Recurrent_neural_network?oldid=717224329>, Apr. 2016, pp. 8.
Ribeiro et al., "Privacy Protection with Pseudonumization and Anonumization in a Health IoT System", Results from OCARIoT, 2019 IEEE, pp. 904-908.
Rivera, Barbara, "New Tools for Combating Income Tax Refund Fraud", https://gcn.com/Articles/2014/05/08/Insight-tax-fraud-tools.aspx?Page=1, May 8, 2014, pp. 3.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Sherly et al., "BOAT Adaptive Credit Card Fraud Detection System", 2010 IEEE International Conference on Computational Intelligence and Computing Research, Dec. 2010, pp. 7.
ShoeBoxed, https://www.shoeboxed.com/sbx-home/ printed Oct. 16, 2012 in 4 pages.
Singletary, Michelle, "The Littlest Victims of ID Theft", The Washington Post, the Color of Money, Oct. 4, 2007.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
Sun et al., "Enhancing Security Using Mobility-Based Anomaly Detection in Cellular Mobile Networks", Jul. 2006, IEEE Transactions on Vehicular Technology, vol. 55, No. 4, pp. 1385-1396.
"The Return Review: Program Increases Fraud Detection; However, Full Retirement of the Electronic Fraud Detection System Will be Delayed", Treasury Inspector General for Tax Administration, Sep. 25, 2017, Reference No. 2017-20-080, pp. 27.
TheMorningCall.Com, "Cheap Ways to Foil Identity Theft," www.mcall.com/business/columnists/all-karp.5920748jul01,0 . . . , published Jul. 1, 2007.
Torgler, Benno, "What Do We Know about Tax Fraud?: an Overview of Recent Developments", Social Research: an International Quarterly, vol. 74, No. 4, Winter 2008, pp. 1239-1270.
"TransUnion—Child Identity Theft Inquiry", TransUnion, http://www.transunion.com/corporate/personal/fraudIdentity Theft/fraudPrevention/childIDInquiry.page as printed Nov. 5, 2009 in 4 pages.
Trivedi et al., "Parallel Data Stream Anonymization Methods: a Review," 2022 Second International Conference on Artificial Intelligence and Smart Energy (ICAIS), 2022, pp. 887-891.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Vamosi, Robert, "How to Handle ID Fraud's Youngest Victims," Nov. 21, 2008, http://news.cnet.com/8301-10789_3-10105303-57.html.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Wilson, Andrea, "Escaping the Alcatraz of Collections and Charge-Offs", http://www.transactionworld.net/articles/2003/october/riskMgmt1.asp, Oct. 2003.
Ye et al., "EWMA Forecast of Normal System Activity for Computer Intrusion Detection", IEEE Transactions on Reliability, Dec. 2004, vol. 53, No. 4, pp. 557-566.
International Search Report and Written Opinion for Application No. PCT/US2007/06070, dated Nov. 10, 2008.
International Search Report and Written Opinion for Application No. PCT/US2008/064594, dated Oct. 30, 2008.
International Preliminary Report and Written Opinion in PCT/US2008/064594, mailed Dec. 10, 2009.
International Search Report and Written Opinion for Application No. PCT/US09/37565, dated May 12, 2009.
Official Communication in Australian Patent Application No. 2012217565, dated May 12, 2017.
Official Communication in Australian Patent Application No. 2017203586, dated Jun. 18, 2019.
Official Communication in Australian Patent Application No. 2019279982, dated Dec. 19, 2019.
Official Communication in Canadian Patent Application No. 2,827,478, dated Jun. 29, 2017.
Official Communication in Canadian Patent Application No. 2,827,478, dated May 31, 2018.
Official Communication in Canadian Patent Application No. 2,827,478, dated Mar. 27, 2019.
Extended European Search Report for Application No. EP12747205, dated Sep. 25, 2014.
Supplementary European Search Report for Application No. EP12747205, dated Jun. 19, 2015.
Extended European Search Report for Application No. EP18748000, dated Dec. 13, 2018.
International Search Report and Written Opinion for Application No. PCT/US2012/025456, dated May 21, 2012.
International Preliminary Report on Patentability in Application No. PCT/US2012/025456, dated Aug. 21, 2013.
International Search Report and Written Opinion for Application No. PCT/US2022/024277, dated Jul. 18, 2022.
International Search Report and Written Opinion for Application No. PCT/US2011/033940, dated Aug. 22, 2011.
Al-Zaben et al., "General Data Protection Regulation Complied Blockchain Architecture for Personally Identifiable Information Management," 2018 International Conference on Computing, Electronics & Communications Engineering (iCCECE), Southend, UK, 2018, pp. 77-82.

(56) References Cited

OTHER PUBLICATIONS

Crane et al., “A Customizable Reputation-based Privacy Assurance System using Active Feedback,” 2006 Securecomm and Workshops, Baltimore, MD, USA, 2006, pp. 1-8.
Sakapertana et al., “Improving REST API Security and Software Integrity through Automated PII Detection Tool Using Machine Learning Techniques,” 2025(ICoCSETI), Jakarta, Indonesia, 2025, pp. 404-409.
Silva et al., “Privacy in the Cloud: a Survey of Existing Solutions and Research Challenges,” in IEEE Access, vol. 9, 2021, pp. 10473-10497.

* cited by examiner

SYSTEM AND METHOD FOR A WORKFLOW ORCHESTRATION PLATFORM FOR FRAUD DETECTION

CROSS-REFERENCE TO RELATED APPLICATIONS

This application is a continuation of U.S. patent application Ser. No. 17/449,904 filed Oct. 4, 2021 and titled "SYSTEM AND METHOD FOR A WORKFLOW ORCHESTRATION PLATFORM FOR FRAUD DETECTION," which claims priority to U.S. Provisional Patent Application No. 63/087,756 filed on Oct. 5, 2020 and titled "SYSTEM AND METHOD FOR A WORKFLOW ORCHESTRATION PLATFORM." The entire contents of the above-referenced applications are hereby expressly incorporated herein by reference in their entireties.

BACKGROUND

The disclosure relates to a fraud decisioning environment for providing more efficient fraud detection workflows to identify fraudulent or potentially fraudulent transactions.

SUMMARY OF EMBODIMENTS

Various systems, methods, and devices are disclosed for providing recursive sub-clustering for generating an automated fraud detection workflow. The systems, methods, and devices of the disclosure each have several innovative aspects, no single one of which is solely responsible for the desirable attributes disclosed herein.

In one embodiment, a system for recursive sub-clustering for generating an automated fraud detection workflow is disclosed. The system may include: a processor; a memory; and computer code stored in the memory, wherein the computer code, when retrieved from the memory and executed by the processor causes the processor to: electronically access a set of transaction data associated with a plurality of consumers and a time range, the set of transaction data including one or more of: email address, geographic data, internet service provider data, age range, device information; electronically access a plurality of executable backing applications configured to provide fraud detection analyses; electronically access a plurality of customizable parameters including one or more of an accuracy threshold parameter, a timing threshold parameter, a performance parameter or a maximum number of backing applications parameter; automatically generate a fraud detection workflow comprising: automatically generate a first set of clusters using at least the set of transaction data and information about the plurality of executable backing application; automatically assign criteria associated with the set of transaction data for each cluster in the first set of clusters; automatically assign one of the plurality of executable backing applications to each cluster in the first set of clusters; and for a first cluster of the first set of clusters where a first predetermined criterion based on at least the plurality of customizable parameters has not been satisfied, automatically generate second set of clusters using at least the set of transaction data and information collected by the plurality of executable backing applications; automatically assign criteria associated with the set of transaction data for each cluster in the second set of clusters; and automatically assign one of the plurality of executable backing applications to each cluster in the second set of clusters, wherein the assigned executable backing application for each cluster in the second set of clusters is different from the executable backing application assigned to the first cluster.

In another embodiment, a computer-implemented method of recursive sub-clustering for generating an automated fraud detection workflow is disclosed. The computer-implemented method may include, as implemented by one or more computing devices configured with specific executable instructions for: electronically accessing a set of transaction data associated with a plurality of consumers and a time range, the set of transaction data including one or more of: email address, geographic data, internet service provider data, age range, or device information; electronically accessing a plurality of executable backing applications configured to provide fraud detection analyses; electronically accessing a plurality of customizable parameters including one or more of an accuracy threshold parameter, a timing threshold parameter, a performance parameter or a maximum number of backing applications parameter; and automatically generating a fraud detection workflow comprising: automatically generating a first set of clusters using at least the set of transaction data and information about the plurality of executable backing application; automatically assigning criteria associated with the set of transaction data for each cluster in the first set of clusters; automatically assigning one of the plurality of executable backing applications to each cluster in the first set of clusters; and for a first cluster of the first set of clusters where a first predetermined criterion based on at least the plurality of customizable parameters has not been satisfied, automatically generating a second set of clusters using at least the set of transaction data and information collected by the plurality of executable backing applications; automatically assigning criteria associated with the set of transaction data for each cluster in the second set of clusters; and automatically assigning one of the plurality of executable backing applications to each cluster in the second set of clusters, wherein the assigned executable backing application for each cluster in the second set of clusters is different from the executable backing application assigned to the first cluster.

In a further embodiment, a non-transitory computer storage medium storing computer-executable instructions is disclosed. The non-transitory computer storage medium may store computer-executable instructions that, when executed by a processor, cause the processor to at least: electronically access a set of transaction data associated with a plurality of consumers and a time range, the set of transaction data including one or more of: email address, geographic data, internet service provider data, age range, or device information; electronically access a plurality of executable backing applications configured to provide fraud detection analyses; electronically access a plurality of customizable parameters including one or more of an accuracy threshold parameter, a timing threshold parameter, a performance parameter or a maximum number of backing applications parameter; and automatically generate a fraud detection workflow comprising instructions to at least: automatically generate a first set of clusters using at least the set of transaction data and information collected by the plurality of executable backing application; automatically assign criteria associated with the set of transaction data for each cluster in the first set of clusters; automatically assign one of the plurality of executable backing applications to each cluster in the first set of clusters; and for a first cluster of the first set of clusters where a first predetermined criterion based on at least the plurality of customizable parameters has not been satisfied, automatically generate second set of clusters using at least the set of transaction data and information about the plurality of executable backing applications; automatically assign criteria associated with the set of transaction data for each cluster in the second set of clusters; and automatically assign one of the plurality of executable backing applications to each cluster in the second set of clusters, wherein the assigned executable backing application for each cluster in the second set of clusters is different from the executable backing application assigned to the first cluster.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate embodiments of the disclosure.

Throughout the drawings, reference numbers are re-used to indicate correspondence between referenced elements. The drawings are provided to illustrate embodiments of the subject matter described herein and not to limit the scope thereof. Specific embodiments will be described with reference to the following drawings.

DETAILED DESCRIPTION

Figure 1:
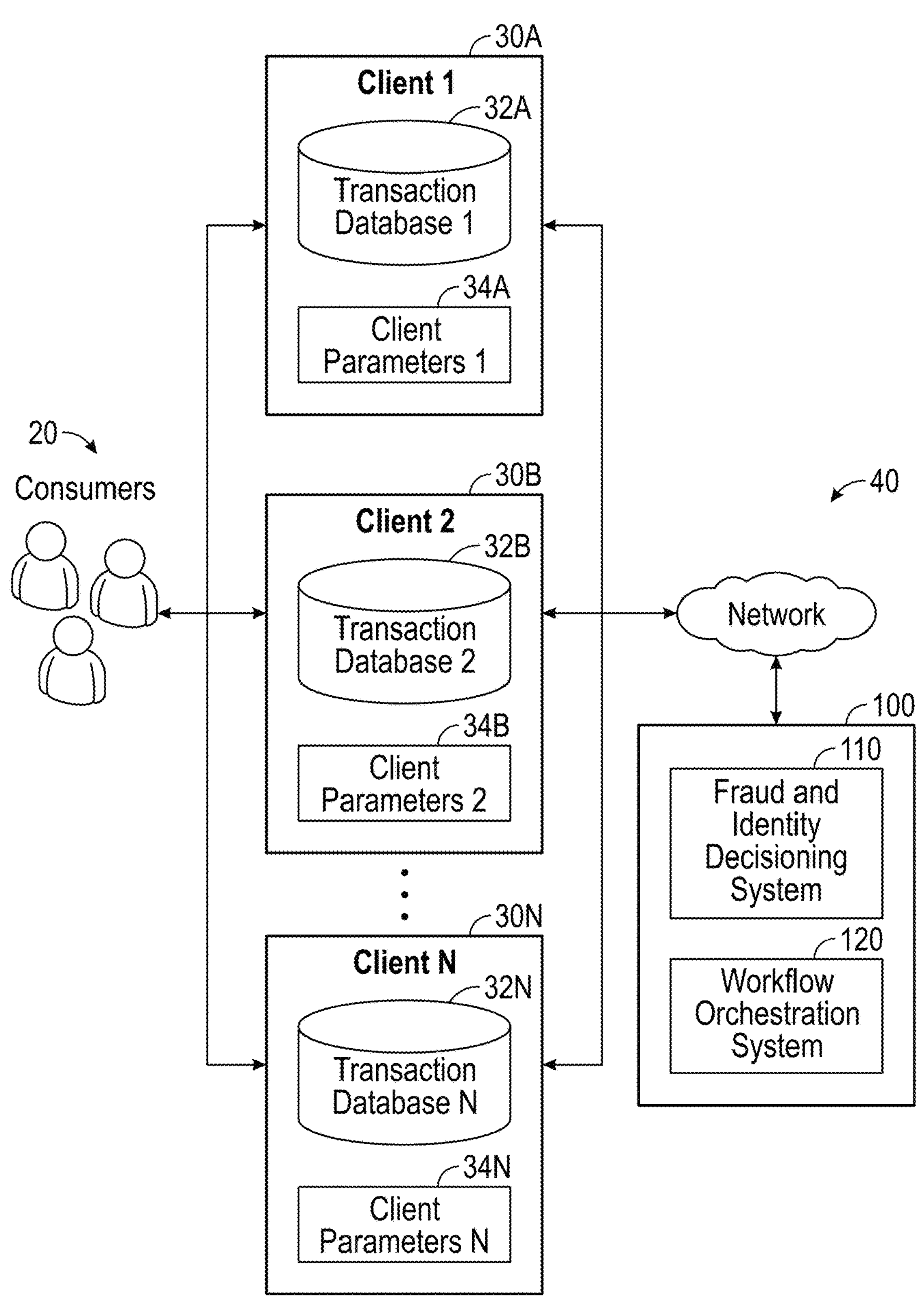
FIG. 1 is an overall system diagram depicting one embodiment of a fraud detection environment using a workflow orchestration platform.

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or which is essential to practicing the embodiments of the disclosure herein described. For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

There has been an explosive growth in the number of online transactions which correlates with a similar increase in the number of fraudulent transactions. Various identity and fraud detection services exist that can review the online transactions as they are being conducted to determine whether a specific transaction is likely fraudulent and if so to flag such transaction for possible denial. However, the use of the identity and fraud detection services may create customer friction and improperly hinder online transactions. Running too many identity and fraud detection services may take too long of a time to process so that the transaction may be cancelled. For example, if a consumer is attempting to purchase a web camera online, there is a high probability that the consumer will not proceed with the transaction if ten different identity and fraud detection services have to be run and take four minutes to process before the transaction is approved. Similarly, some transactions may not warrant running multiple identity and fraud detection services. For example, if a consumer is attempting to purchase a five dollar ($5) cell phone case, it may not make sense to require the consumer to provide a copy of a driver's license, answer several authentication questions, and also provide multiple sets of biometric information. Further, different identity and fraud detection services may be more accurate depending on the information that can be provided. For example, it may not make sense to run an email address check if the transaction does not include email address information. Thus, there are a lot of factors can affect which identity and fraud detection services should be utilized based on the specific transaction as well as the parameters provided by the client. For a client that processes thousands upon thousands of transactions a day, it is not feasible to manually select which identity and fraud detection services should be utilized.

In some embodiments, a workflow orchestration system can analyze consumer transaction data (for example, historical transaction data) of a client and employ machine learning models to generate the configurations of identity and/or fraud detection services to be automatically executed during a real-time transaction in order to automatically flag whether a specific transaction is fraudulent. The workflow orchestration system can automatically generate a workflow of which specific identity and/or fraud risk services to deploy, in what order, and under what conditions without the need for manual intervention or review by analytics teams. Additionally, the workflow orchestration system can reduce "over-solutioning," where a client system calls or requests multiple identity and/or fraud risk services that might add little value or are unnecessary to detect fraud. Moreover, some embodiment of the workflow orchestration system can provide a new alternative fraud management business modeling system that generates and analyzes configuration options. The generated workflow is specific to a client and based on that client's historical transaction data. Thus, the workflow orchestration system can generate one workflow for one client and a different workflow for another client. Also, because the client's historical transaction data changes, the workflow orchestration system can generate one workflow for a client based on a first set of historical transaction data based on a first time frame, and then generate a different workflow for the same client using different set of historical transaction data based on a later time frame.

In some embodiments, the workflow orchestration system can optimize the right combination of runtime services in the right sequence to maximize or improve fraud detection performance. The workflow orchestration system can be driven by artificial intelligence ("AI"). The workflow orchestration system can optimize or improve the right combination of, for example, identity and/or fraud risk services that are executed during an ongoing transaction to increase or maximize clients' identity and/or fraud decisioning and/or performance expectations, either in terms of fraud detection and false positives, or in terms of price-performance ratio (depending on which is most ideal for the client). In some embodiments, the workflow orchestration system can implement a greedy algorithm to select the services to incorporate into the workflow at each given point in the identity and fraud decisioning process.

In some embodiments, the workflow orchestration system can enhance fraud detection workflows based on a client's defined fraud detection threshold(s) by calling services that improve fraud detection in downstream risking. Automatic workflow configurations can be generated under a set of conditions predetermined by a client. In some embodiments, the optimized workflow can provide optimized fraud detection performance that satisfies a performance criterion (for example, a desired level of fraud detection performance).

In some embodiments, the workflow orchestration system can integrate internal and third-party data sources to generate segments or clusters of users (for example, consumers) and to select optimized downstream services and workflows. In order to provide more diverse initial segments of user (or consumer) populations, a clustering process can be used in conjunction with other data sources. These data sources (for example, third party data sources) can inform learning models to find more distinct and relevant categories of transactions. As described herein, such learning models can be supervised or unsupervised. For example, the workflow orchestration system may append demographic data from other data sources (for example, third party data sources) to further segment users by geography or spend potential. In some examples, address standardization services may be used to differentiate valid addresses from those that are undeliverable. Those data points could help further segment users via the unsupervised modeling process.

In some embodiments, the workflow orchestration system can incorporate a user interface to allow clients to select parameters or thresholds to be used for generating a configuration of identify and/or fraud risk services. In order to allow users to interact with and configure the process for their customer interactions, the workflow orchestration system can provide a user interface to clients that can allow clients to adjust parameters and create their desired fraud detection workflow or target result. The user interface may allow clients to adjust their parameters such as monthly fraud detection cost, expected ROI, desired fraud performance threshold, and so forth. Optionally, the user interface may allow clients to select which identity and fraud services to be included in the workflow and incorporate any constraints like monthly minimum pricing requirements. After providing parameters and/or thresholds, clients can trigger the workflow orchestration process, which can generate an optimized fraud detection workflow for the parameters provided. The optimized fraud detection workflow can dictate the path and interrogation of each customer interaction (for example, a customized risking workflow to optimize the client outcome for each transaction). The user interface may be accessible via a Software as a Service portal offered by the workflow orchestration system, and/or it may be accessible via an application that runs locally within the client's systems or on a server of a client's cloud provider.

In some embodiments, the workflow orchestration system may support "hybrid workflows", which are workflows that are initially determined automatically via historical transaction data, and then be edited manually by clients to account for specific conditions. This "manual override" feature can allow clients to set additional constraints for, for example, certain types of transactions to run through a pre-defined set of services, even if the workflow provided by the workflow orchestration system does not require it. For example, for a high-dollar luxury item like a diamond ring, a client may require that all identity and fraud services are called to ensure absolute certainty around the authenticity and fraud risk of the customer.

Optionally, clients can have the option to set some workflows manually within an external system and to have other workflows automated via the workflow orchestration system. This can advantageously allow clients to leverage certain identity and fraud services based on their analytical and fraud expertise. In areas with little expertise, clients may utilize customer segmentation and workflows provided by the workflow orchestration system described herein.

Fraud Decisioning Environment

FIG. 1 is an overall system diagram illustrating an example embodiment of a fraud decisioning environment 10 for providing customized, faster, or cost-friendly fraud detection workflow customize based on specific client-provided transactional data and client-provided parameters. The environment 10 shown in FIG. 1 can include consumers 20, client systems 30A, 30B, . . . 30N, a network 40, and a decision analytics system 100.

The clients (for example, the client systems 30A, 30B, . . . , 30N) can each include a transaction database (for example, transaction databases 32A, 32B, . . . , 32N) and client parameters (for example, client parameters 34A, 34B, . . . , 34N). The transaction databases 32A, 32B, . . . , 32N can include transaction data associated with transactions conducted by one a set of the consumers 20. For example, the transactions data can represent transactions (for example, online transactions) conducted by the consumers 20 with the clients 30A, 30B, . . . , 30N.

Some examples of the transaction data can include, but are not limited to, payment methods (for example, credit cards and debit card), payment term length (for example, one-time payment, 2 months, 3 months, 6 months, 12 months, 24 months, 60 months, and so forth), amount of credit history (for example, less than 5 years, greater than 5 years and less than 10 years, greater than 10 years, and so forth), device information (for example, device brand, IP address, operating system, user agent, and so forth), product type (for example, electronics, clothes, cars, books, and so forth), purchase dollar amount (for example, less than $25, greater than $25 and less than $50, greater than $50 and less than $100, greater than $100 and less than $500, and so forth), Internet service provider (for example, Cox Communications, Charter Communications, AT&T Internet Services, and so forth), consumer credit history, and so forth. The transaction data may be historical transaction data and may include historical fraud determinations and/or truth-marked data indicating whether or not a specific transaction was fraudulent or not.

In some embodiments, the transaction data may be collected by the clients 30A, 30B, . . . , 30N and stored in the corresponding transaction databases 32A, 32B, . . . , 32N. It is recognized that the database may be stored in whole or in part on site in a client facility or in cloud storage controlled by the client. In some embodiments, the transaction data may be collected at different stages of corresponding transactions (for example, during log-in, before purchase, after purchase, and so forth). The transaction data may be stored individually or in batches.

The client parameters 34A, 34B, . . . , 34N can represent various constraints or thresholds associated with a fraud decisioning process, for example, performed by the decision analytics system 100 on behalf of the clients 30A, 30B, . . . , 30N. Based on the client parameters 34A, 34B, . . . , 34N, the decision analytics system 100 can automatically generate a fraud decisioning workflow (via the workflow orchestration system 120) that satisfies the client parameters 34A, 34B, . . . , 34N and customized based on the client's transaction data. Additional details regarding the client parameters 34A, 34B, . . . , 34N are disclosed herein.

The network 40 can comprise one or more networks, including, for example, a LAN, WAN, and/or the Internet, for example, via a wired, wireless, or combination of wired and wireless, communication links. The network 40 can facilitate communication between the client systems 30A, 30B, . . . , 30N and the decision analytics system 100. The client systems 30A, 30B, . . . , 30N can transmit (for example, wirelessly) or make electronically available consumer transaction information stored in the corresponding transaction databases 32A, 32B, . . . , 32N to the decision analytics system 100 via the network 40. Additionally, the client systems 30A, 30B, . . . , 30N can transmit (for example, wirelessly) or make electronically available client parameters stored in the corresponding transaction databases 34A, 34B, . . . , 34N to the decision analytics system 100 via the network 40. In some embodiments, the decision analytics system 100 includes a user interface portal that allows the client parameters to be submitted and stored in the decision analytics system 100. In some embodiments, the network 40 can be associated with (for example, operated by) the one or more of the clients 30A, 30B, . . . , 30N or the decision analytics system 100 (for an entity associated with the decision analytics system 100).

Workflow Orchestration System

Figure 2:
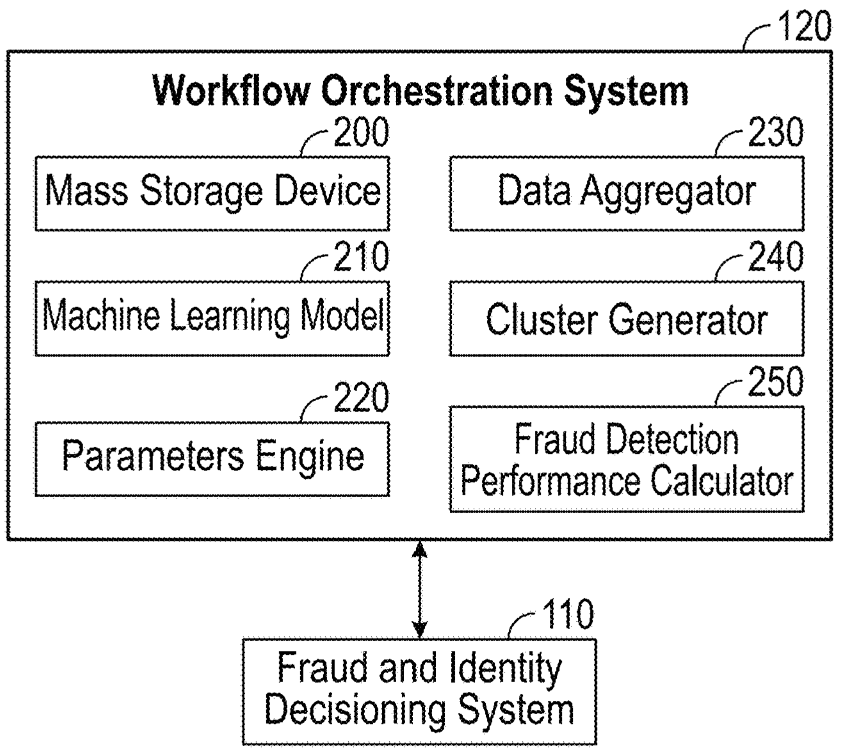
FIG. 2 is a block diagram illustrating an embodiment of a decision analytics system.

FIG. 2 is a block diagram illustrating an example embodiment of the decision analytics system 100. The decision analytics system 100 can include a fraud and identity decisioning system 110 and a workflow orchestration system 120. The workflow orchestration system 120 can include a mass storage device 200, a machining learning model 210, a parameters engine 220, a data aggregator 230, a cluster generator 240, and a fraud detection performance calculator 250.

The storage device 200 can store data received from the clients 30A, 30B, . . . , 30N. The data stored in the storage device 200 can include the transaction information associated with the customers 20, the client parameters 34A, 34B, . . . , 34N, and so forth. Additionally, the storage device 200 can store workflows generated by the machine learning model 210 for identifying potentially fraudulent transactions. In some embodiments, the storage device 200 may be a cloud-based remote storage device.

The machine learning module 210 may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as personal identifying information.

The machine learning model 210 can run automated processes by which received transaction data for one or more clients is analyzed to generate and/or update one or more fraud detection workflows. For example, the machine learning module 210 can receive transaction data from the client systems 30A, 30B, . . . 30N and segment or cluster the transaction data based on a number of attributes including, but not limited it, consumer profile (for example, geographic data, age range, employment, income level, and so forth), device information (for example, device brand, IP address, operating system, and so forth), transaction profile (for example, product purchased, transaction amount, and so forth), and so forth. Based on the segments generated, the machine learning module 210 can identify (or determine) a backing application (for example, identity and/or fraud risk services) for each segment or cluster.

In some embodiments, the machine learning module 210 can segment or cluster the transaction data into multiple groups based on, for example, similarity and dissimilarity between the groups. In some embodiments, unsupervised machine learning can be used to segment the transaction data into multiple groups or cluster. Within each group or cluster, a backing application can be selected. The backing application for each group or cluster can provide optimized (for example, the highest fraud detection rate) or improved fraud detection performance. If one of the stopping criteria is satisfied, the iterative algorithm can stop and output a workflow layout that includes backing applications selected for the groups or clusters. If the stopping criteria is not satisfied, the iterative algorithm can repeat the process of generating subgroups or subclusters and selecting at least one backing application for each of the subgroups or subclusters can continue until one of the stopping criteria is satisfied.

In some embodiments, the machine learning module 210 can utilize an iterative algorithm to determine which backing applications to use, in what order to use them, and under what conditions they should be utilized. As discussed herein, one or more backing applications may be used in different scenarios. The iterative algorithm can optimize or improve the fraud detection in different scenarios, while satisfying the business requirements and constraints. In some embodiments, the iterative algorithm can include a repeatable, unsupervised learning process that, for example, continuously clusters samples of transactions into different groups or clusters and selects a backing application that provides optimized fraud detection performance for each group or cluster. The unsupervised learning process can generate a workflow or path for each of the clusters. In some embodiments, different clusters may have different workflows or paths. In some embodiments, different clusters may have different combinations of workflows or paths (for example, in different orders).

In some embodiments, the machine learning module 210 can receive truth-marked data from a client (for example, one of the client systems 30A, 30B, . . . , 30N) and use the truth-marked data to generate a new fraud detection workflow or update an existing fraud detection workflow. In some embodiments, the machine learning module 210 can receive updated client parameters to generate a new fraud detection workflow or update an existing fraud detection workflow.

The parameters engine 220 can access client parameters (for example, one or more of the client parameters 34A, 34B, . . . , 34N) stored in the storage device 200 and determine whether client parameters are satisfied. Optionally, the parameters engine 220 can, for example, receive information related to backing applications (for example, a number of backing applications used or costs associated with each of the backing applications) or performances of those backing applications (for example, fraud detection rate) from the machine learning model 210 or the performance calculator 250 and determine whether client parameters are satisfied. In some embodiments, the machine learning module 210 can meet a certain fraud detection performance threshold based on a predefined annual or monthly cost to the client for running, calling, or executing certain backing applications. As such, the workflow orchestration system may automatically determine more effective services based on the client's criteria or expected outcome. For example, if a client has a fixed monthly budget, the workflow orchestration system can generate an optimized workflow that fits within the predetermined budget. In some embodiments, the optimized workflow can provide optimized fraud detection performance within budget constraints preset by the client.

The data aggregator 230 can receive and aggregate transaction data from the clients (for example, one or more of the client systems 30A, 30B, . . . , 30N) for analysis by the machine learning model 210 for identifying attributes associated with the transaction data or for generating clusters by the cluster generator 240.

The cluster generator 240 can divide transaction data from the client(s) into smaller clusters. The clusters can be generated based on different attributes associated with the transaction data. For example, the cluster generator 240 can generate clusters based on user information (for example, user ID, delivery address, and so forth), device information (for example, operating system, IP address, user agent, and so forth), or transaction information (for example, transaction amount, type of product purchased, and so forth). Other types of attributes (for example, an internet service provider) may also be utilized in generating clusters. In some embodiments, the cluster generator 240 creates clusters based on information collected by the specific backing application chosen in an upper cluster (or a previous cluster or parent cluster).

The fraud detection performance calculator 250 can calculate fraud detection performance of one or more of backing applications for detecting fraudulent or potentially fraudulent transactions from a given cluster. As described herein, the transaction data from the clients can include truth-marked data that can be used to determine fraud detection performance of one or more backing applications. In some embodiments, the fraud detection performance calculator 250 can be a part of the decisioning system 110.

Client Parameters

Figure 3:
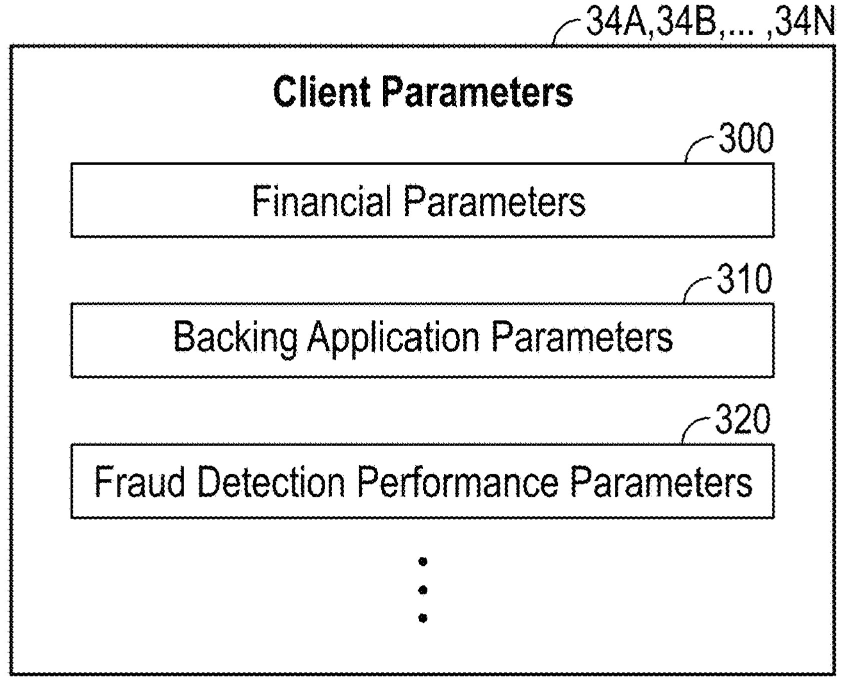
FIG. 3 is a block diagram illustrating embodiments of client parameters.

FIG. 3 shows a block diagram illustrating example embodiments of client parameters 34A, 34B, . . . , 34N. The client parameters 34A, 34B, . . . , 34N can include financial parameters 300, backing application parameters 310, and fraud detection performance parameters 320. It is contemplated that clients (for example, client systems 30A, 30B, . . . , 30N) can use other types of parameters for, for example, generating fraud detection workflows using the workflow orchestration system 120. It is recognized that the parameters may be specific to a client, and that a client may have different parameters for different workflows (for example, one workflow for transactions over $1000 and a different workflow for transaction under $1000, one workflow for transactions from online store X and a different workflow for transactions from online store Y, one workflow for transactions from geographic region A and a different workflow for transactions from geographic region B).

The backing application parameters 310 can include parameters related to use of backing applications for generating fraud detection workflows. For example, backing application parameters 310 of a given client may include one or more backing applications that may not be used or required in a fraud detection workflow for the given client. In another example, backing application parameters 310 may include a minimum or a maximum number of backing applications that may be used in a fraud detection workflow for a given client. For example, a client may not wish to have more than four backing applications because running more than four backing applications tend to become very expensive with relatively small amount of improvement in fraud detection rate (or performance).

The fraud detection performance parameters 320 can include parameters related to the performance of a backing application for a cluster of transaction data of a given client. For example, the fraud detection performance parameters 320 may include a predetermined performance threshold index or value (for example, 95% accuracy for detecting potentially fraudulent transactions).

In some embodiments, the predetermined performance threshold index or value may vary depending on a number of backing applications being used. Such variation in the performance threshold index can reflect the expectation of increase in fraud detection performance when more backing applications are used. For example, the fraud detection performance parameters 320 may have a performance threshold index of 85% when one backing application used, and a higher performance threshold of 90% when two backing applications are used.

The financial parameters 300 may include parameters related to budgets for a fraud detection workflow or costs associated with backing applications. For example, the financial parameters 300 can include a maximum amount of budget allotted for use of backing applications for detecting potential fraudulent transactions. Such parameter can the workflow orchestration system 120 from using certain combinations of backing applications for a given client. For example, based on a budget limit parameter for Client Y, backing application X may be too exhaustive and costly to use as a first backing application for one of initial clusters. As such, combinations of backing applications having backing application X as the first backing application may not be used for Client Y. However, for subsequent subclusters that may have less transaction data than the initial clusters, backing application X may be used (for example, as the second or the third backing application) since it may not be as exhaustive and costly to run backing application X for smaller subclusters. Additionally, the financial parameters 300 can include a return-on-investment (ROI) parameter. For example, the ROI parameter can represent a client's average dollar loss amounts by fraud type and their expected dollar amount return for each fraud prevention.

In some embodiments, the workflow orchestration system 120 may be able to automatically calculate and generate client analytics data (for example, associated with budget, fraud detection performance, ROI, and so forth) along with alerts, notifications, or flags when predetermined thresholds or limits have been exceeded or have not been met (or satisfied). Such information may be provided through business intelligence reporting. For example, the workflow orchestration system 120 can append the analytic data to business intelligence reports to, for example, highlight ROI optimization targets and historical and trended performance data. Optionally, such ROI reporting can use clients' average dollar loss amounts by fraud type and their expected dollar amount return for each fraud prevention. In some embodiments, the workflow orchestration system 120 can generate a report that includes a client's fraud and other performance metrics by services called, use case, and business line. Optionally, the report can incorporate alerts to identify when the performance of certain workflows is not satisfying a client's pre-defined performance threshold.

Example Fraud Detection Workflows

Figure 4:
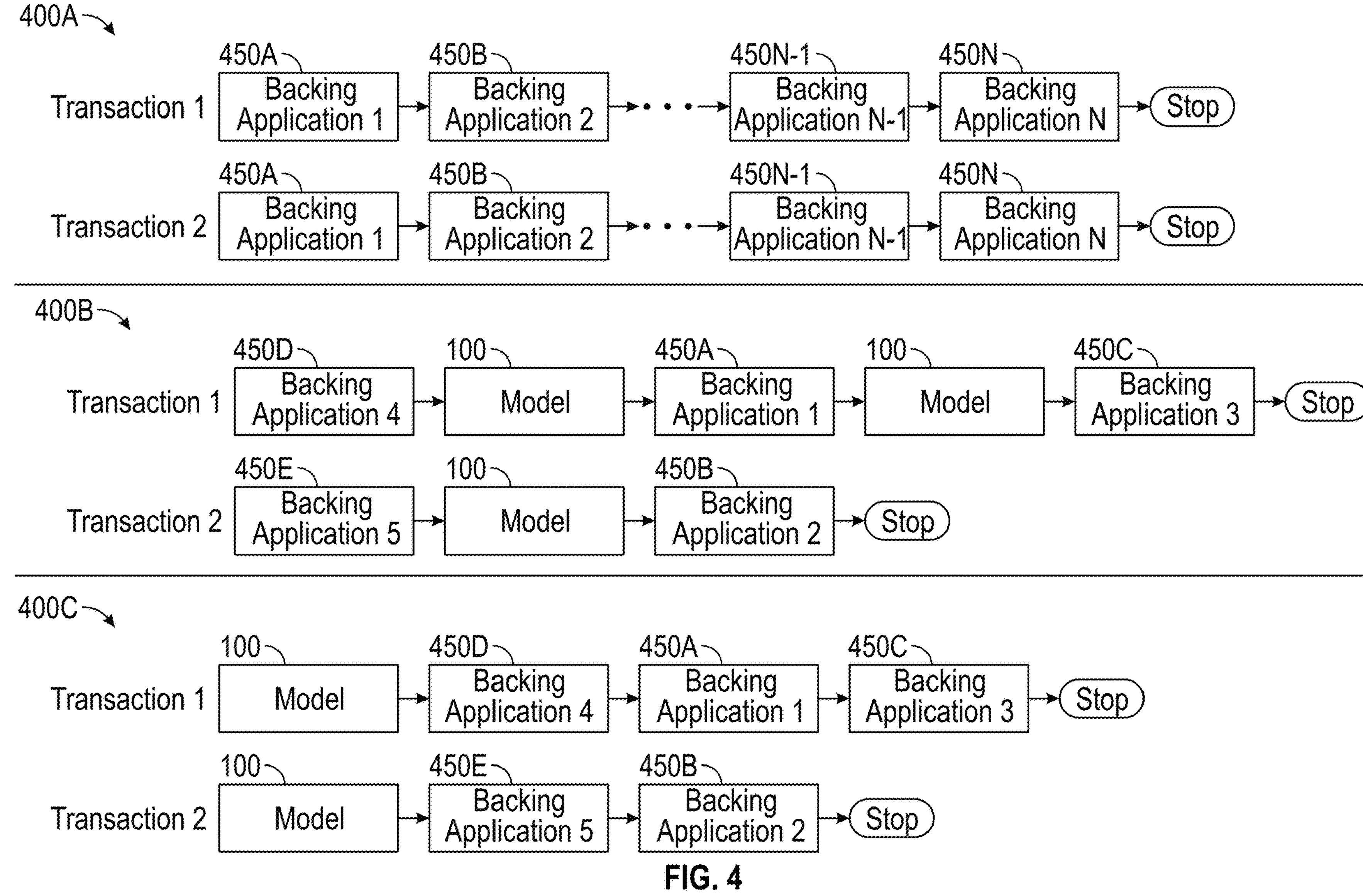
FIG. 4 is a block diagram illustrating embodiments of example fraud detection workflows.

The workflow orchestration system 120 can provide a more efficient, proactive approach to fraud management via a statistically-optimized fraud detection workflow. FIG. 4 is a block diagram illustrating example embodiments of different fraud detection workflows as deployed. A first workflow 400A shows fraud detection workflows deployed such that they are executing for two different online transactions (that is, Transaction 1 and Transaction 2) without using the workflow orchestration system 120 described herein to generate the workflow. The workflow orchestration system 120 may receive information associated with Transaction 1 and Transaction 2 from an online transaction platform (for example, one of the clients 30A, 30B, . . . , 30N). Without the workflow orchestration system 120, both Transaction 1 and Transaction 2 may utilize all of the backing applications 450A, 450B, . . . , 450N-1, 450N regardless of the information received during the transaction. While using a predetermined set of backing applications for all transactions can result in improved accuracy for detecting potentially fraudulent transactions, it can, however, be costly and time-consuming especially for certain types of transactions that may not need all of backing applications in the predetermined set to achieve satisfactory fraud detection performance.

A second workflow 400B and a third workflow 400C show example workflows for Transaction 1 and Transaction 2 with the workflow orchestration system 120. Specifically, the second workflow 400B illustrates how the workflow orchestration system 120 can be used to automatically generate fraud detection workflows that utilize transaction data to determine which backing applications to execute or call. For example, as shown in FIG. 4, the workflow orchestration system 120 may utilize a backing application 450D ("Backing Application 4") as a first backing application for Transaction 1, while utilizing a backing application 450E ("Backing Application 5") as a first backing application for Transaction 2.

The choice of the first backing application for Transaction 1 and Transaction 2 can be based on one or more attributes associated with Transaction 1 and Transaction 2. For example, Transaction 1 may be associated with a less-common Internet Service Provider (ISP) and the backing application 450D may be more effective in detecting potentially fraudulent transactions within a cluster of transactions associated with a less-common ISP. On the other hand, Transaction 2 may be associated with a very common ISP and the backing application 450E may be more effective in detecting potentially fraudulent transactions within a cluster of transactions associated with a very common ISP.

After identifying the first backing application for Transaction 1 and Transaction 2, the workflow orchestration system 120 of the decision analytics system 100 can determine whether client parameters (for example, one of the client parameters 34A, 34B, . . . , 34N) are satisfied. If the client parameters are not satisfied, another backing application may be selected by the model 100. For example, as shown in FIG. 4, the subsequent backing application may be a backing application 450A ("Backing Application 1") for Transaction 1, and a backing application 450B ("Backing Application 2") for Transaction 2. In the example shown in FIG. 4, a combination of the backing applications 450E, 450B satisfies client parameters for Transaction 2 and the workflow orchestration system 120 can stop its workflow execution process. However, for Transaction 1, another backing application (that is, a backing application 450C) is identified in addition to the backing applications 450D, 450A prior to the workflow orchestration system 120 stopping its workflow execution process.

Once the workflow has been generated and deployed, the decision analytics system 100 may receive information about an ongoing transaction and then determine a likelihood that the given transaction may be fraudulent. The decision analytics system 100 (or the workflow orchestration system 120) may analyze the information provided for Transaction 1 in view of the deployed workflow to generate and transmit instructions to execute or call backing applications 450D, 450A, and 450C in that order. On the other hand, the decision analytics system 100 (or the workflow orchestration system 120) may analyze the information provided for Transaction 2 in view of the deployed workflow to if generate and transmit instructions to execute or call the backing applications 450E and 450B in that order. As shown in FIG. 4, the workflow orchestration system 120 can determine which backing application(s) (that is, identity and/or fraud risk services) to execute or call, in what order, and under what conditions (for example, based on the information provided during the transaction). In addition, by allowing clients to provide their parameters, the workflow orchestration system 120 and automatically generate a customized, optimized, fraud detection workflow that can be deployed to analyze ongoing transactions that meet the client's criteria and while potentially reducing the costs associated with identifying potentially fraudulent transactions.

Fraud Detection Workflow Generation Process

Figures 5, 6:
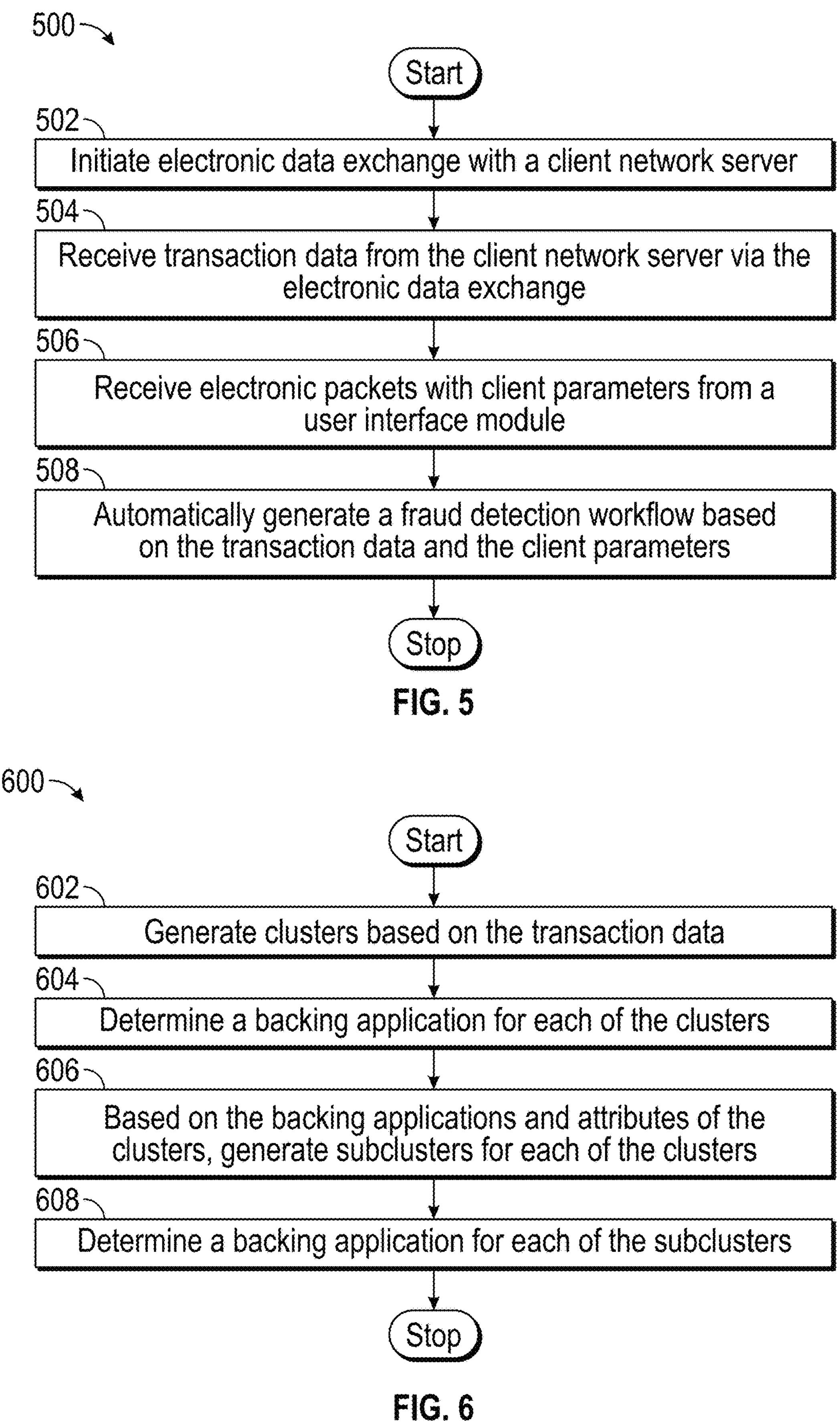
FIG. 5 is a flow diagram illustrating an embodiment of a process for generating a fraud detection workflow.
FIG. 6 is a flow diagram illustrating an embodiment of a process for generating subclusters and determining a backing application for subclusters.

FIG. 5 is an embodiment of a flow diagram illustrating an example method 500 of generating a fraud detection workflow. The method 500 may be performed by the workflow orchestration system 120. At block 502, the workflow orchestration system 120 of the decision analytics system 100 can initiate electronic data exchange with a client network server (for example, one of the client systems 30A, 30B, . . . , 30N). At block 504, the workflow orchestration system 120 can receive transaction data from the client network server via the electronic data exchange. As described herein, the electronic data exchange and the transmission of transaction data between the client network server and the workflow orchestration system 120 can be made via the network 40. At block 506, the workflow orchestration system 120 can receive electronic packets that include client parameters (for example, one of the client parameters 34A, 34B, . . . , 34N) from the client systems 30A, 30B, . . . , 30N or via, a user interface module. The user interface module may be a website user interface or a mobile application user interface used to collect parameters that can then be stored in the workflow orchestration system 100. At block 508, the workflow orchestration system 100 can automatically generate a fraud detection workflow based on the transaction data and the client parameters.

Backing Application Selection Process

FIG. 6 is an embodiment of a flow diagram illustrating an example method 600 of identifying backing applications for different clusters of transaction data received from a client. At block 602, the workflow orchestration system 120 can generate clusters based on transaction data, for example, received from a client (for example, one of the clients 30A, 30B, . . . , 30N). The clusters can be generated using artificial intelligence or modeling techniques to analyze attributes described herein such as device type (for example, a desktop, a laptop, a mobile device, and so forth), operating system of a device used for transaction (for example, Windows, Linux, IOS, Android, and so forth), length of credit history (for example, less than 5 years, greater than 5 years and less than 10 years, greater than 10 years and less than 15 years, and so forth), transaction amount, and so forth. At block 604, the workflow orchestration system 100 can determine (or identify) a backing application for each of the clusters. In some embodiments, a backing application for a given cluster can be identified based on how well it can predict or successfully identify potentially fraudulent transactions in the given cluster (of transaction data). For example, a backing application for a given cluster may be one that has the highest performance index (for example, has the highest likelihood of successfully identifying a fraudulent or potentially fraudulent transaction) for the given cluster. At block 606, subclusters can be generated for the clusters based on the backing applications (for example, ones generated at block 602). In some embodiments, subclusters can be generated for clusters having a corresponding backing application that does not, for example, satisfy client parameters (for example, desired fraud detection performance, a number of backing applications used, budget, and so forth). Additionally, subclusters can be generated based on attributes of the clusters (for example, ones generated at block 602). For example, a cluster generated at block 602 may include transactions associated with transaction amount less than $100, and subclusters may be generated based on a type of product purchased, an ISP, or amount of credit history. At block 608, a backing application can be determined for each of the subclusters (for example, ones generated at block 606).

Recursive Clustering Process

Figure 7:
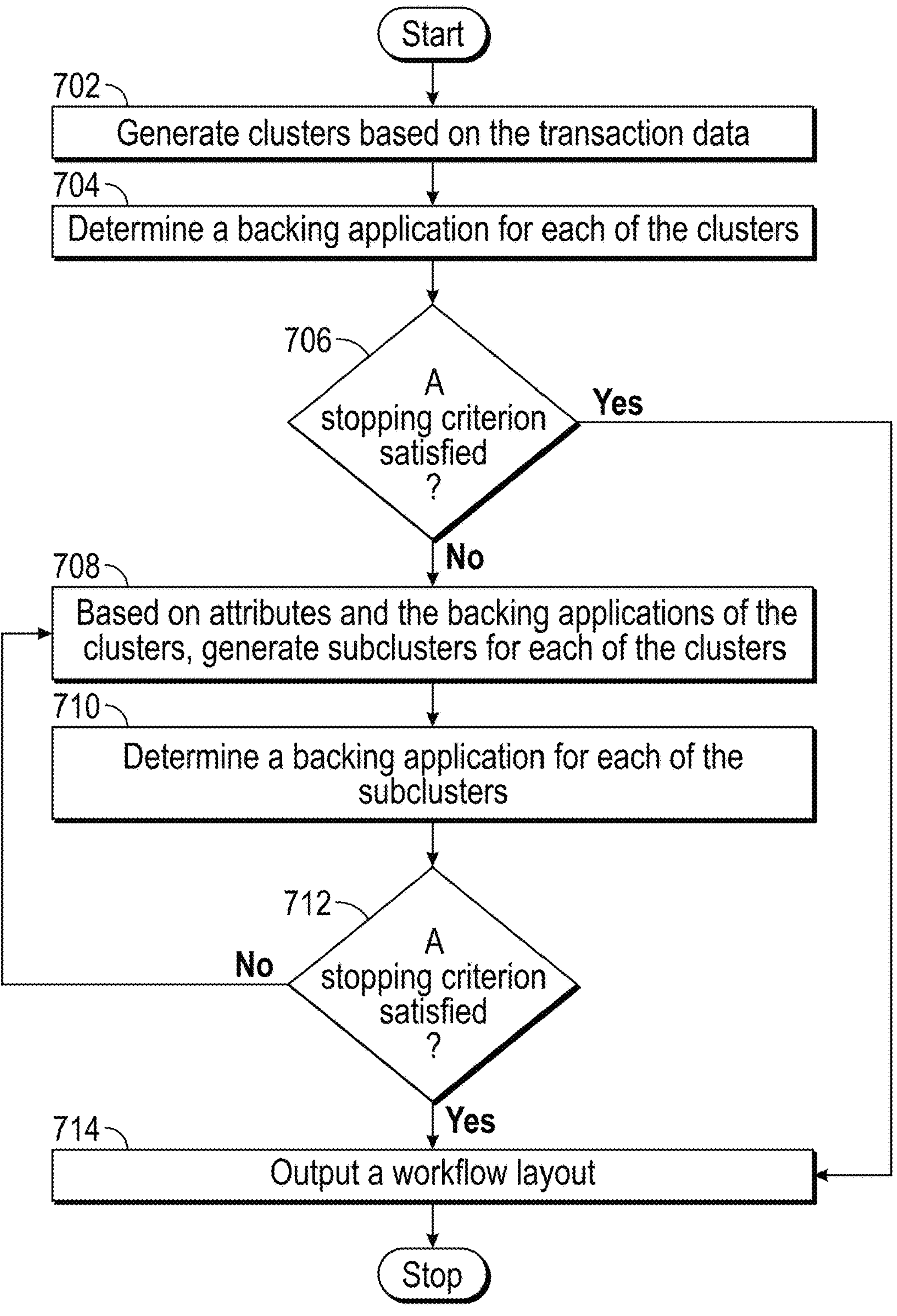
FIG. 7 is a flow diagram illustrating another embodiment of a process for generating a fraud detection workflow.

FIG. 7 is an embodiment of flow diagram illustrating an example method 700 for generating a fraud detection workflow for a client using recursive clustering approach. At block 702, the workflow orchestration system 120 can use artificial intelligence or modeling techniques to generate clusters for transaction data received from a client (for example, one of the clients 30A, 30B, . . . , 30N). As described herein, the clusters can be generated based on one or more attributes of the transaction data. In some embodiments, the transaction data can be a portion of a training transaction dataset that includes, for example, device information, user (or consumer) information, transaction information (for example, purchase price, purchase method, and so forth), results from multiple backing applications, and fraud truth-marking (that is, indications that a given transaction was fraudulent or was not fraudulent).

At block 704, a backing application can be determined for each of the clusters (for example, generated at block 702). A backing application determined (or identified) for a given cluster may provide, for example, the best chance of successfully identifying a fraudulent or potentially fraudulent transactions for the given cluster. At block 706, the workflow orchestration system 120 can determine whether a stopping criterion has been satisfied. The determination of whether the stopping criterion has been satisfied can be made for each cluster and a corresponding backing application. In some embodiments, the stopping criterion may be satisfied when a given backing application for a given cluster satisfies all client parameters (for example, one of the client parameters 34A, 34B, . . . , 34N). In other embodiments, the stopping criterion may be satisfied when a use of an additional backing application does not provide sufficient increase in fraud detection performance or ROI. If the stopping criterion is satisfied, the workflow orchestration system 120 can output (or generate) a fraud detection workflow at block 714. If the stopping criterion is not satisfied, the workflow orchestration system 120 can generate subclusters at block 708 for each cluster having a backing application that does not satisfy the stopping criterion.

At block 710, a backing application is determined for each of the subclusters (for example, ones generated at block 708). At block 712, the workflow orchestration system 120 can determine whether each of the subclusters and its corresponding backing application (for example, ones determined at block 710) satisfy a stopping criterion at block 712. The stopping criterion used at block 712 may be the same with or different from the stopping criterion used at block 706. For example, a fraud detection performance threshold associated with the stopping criterion used at block 712 may be greater than that associated with the stopping criterion used at block 706. If the stopping criterion is satisfied at block 712, the workflow orchestration system 120 can output a fraud detection workflow at block 714. If the stopping criterion is not satisfied at block 712, the workflow orchestration system 120 can generate another set of subclusters for each subcluster (for example, from the subclusters previously generated at block 708) having a backing application that does not satisfy the stopping criterion associated with block 712. The process of generating subclusters, determining a backing application for each of the subclusters, and evaluating each of the subclusters and its corresponding backing application to determine whether a stopping criterion is satisfied can be performed recursively until a stopping criterion associated with a client is satisfied and a fraud detection workflow is generated.

Example Fraud Detection Workflow Generation

Figure 8A:
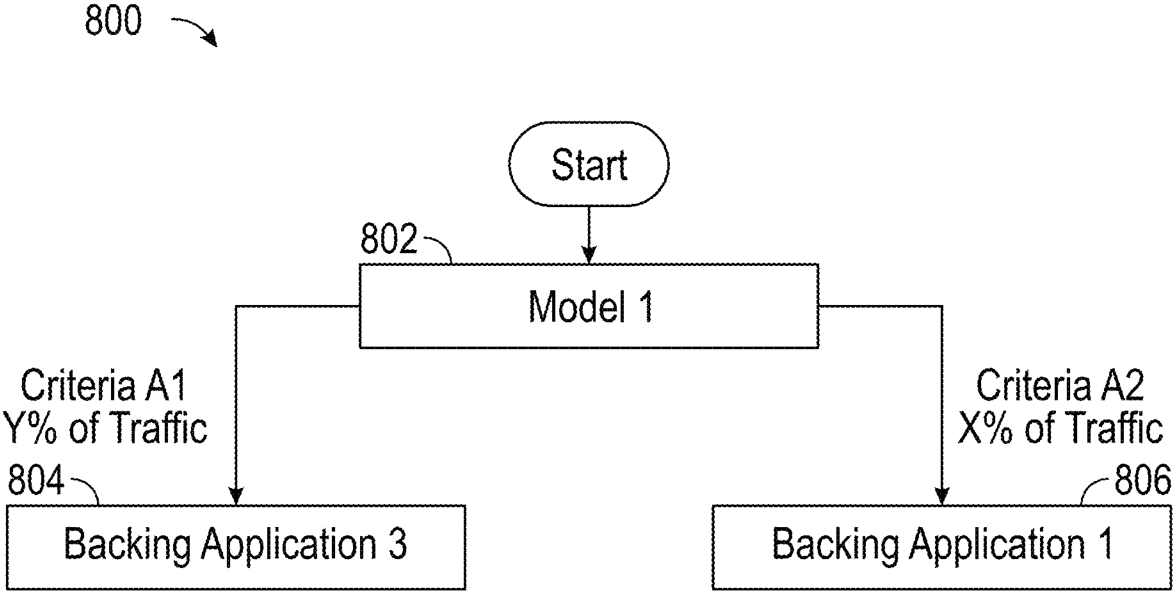
FIGS. 8A, 8B, and 8C are block diagrams illustrating an embodiment of a process for generating a fraud detection workflow.
Figure 8B:
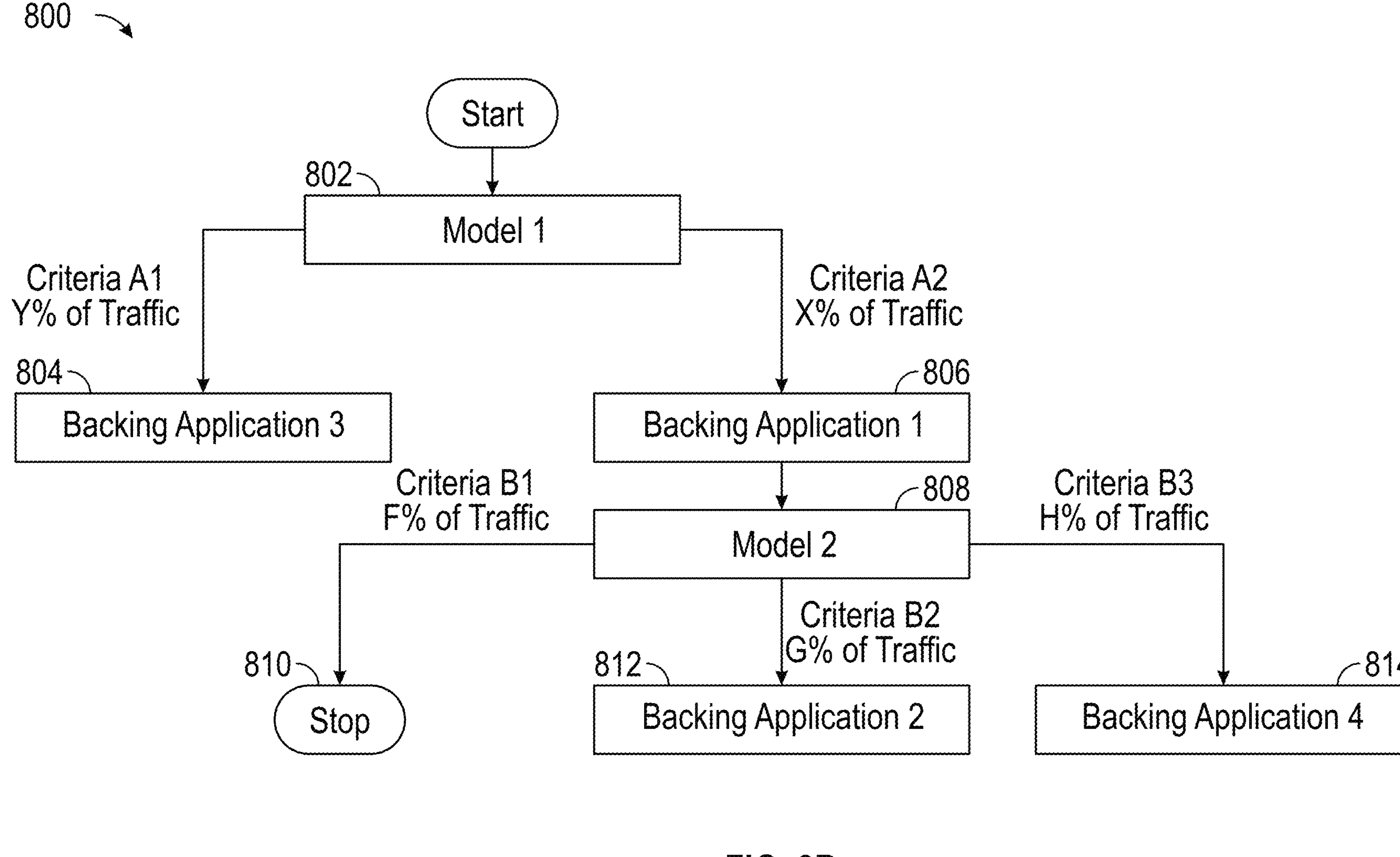
Figure 8C:
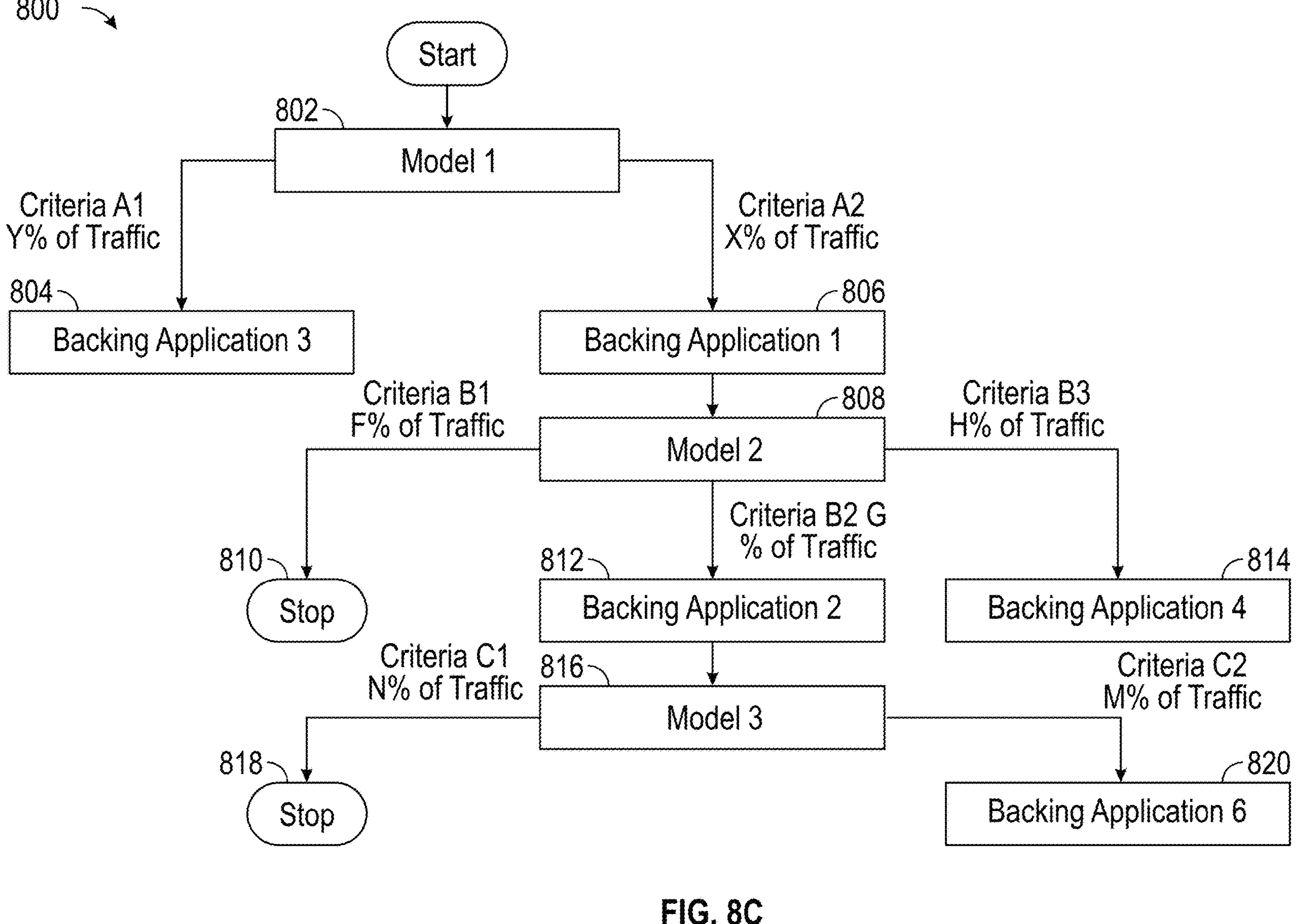

FIGS. 8A-8C show example embodiments of a flow diagram 800 illustrating an example process of generating a specific fraud detection workflow. As described herein, the workflow orchestration system 120 can receive transaction data (for example, a training dataset for training the machine learning module 210) from a client (for example, one of the clients 30A, 30B, . . . , 30N). The workflow orchestration system 120 can generate a first model 802 ("Model 1") using the received transaction data to identify two different clusters with corresponding backing applications. In the example shown in FIG. 8A, a first cluster 804 is associated with Criteria A1 (for example, a less-common ISP) and includes Y % of the transaction data provided to the first model 802, while a second cluster 806 is associated with Criteria A2 (for example, a well-known ISP) and includes X % of the transaction data provided to the first model 802. In this example, the sum of X and Y is 100, indicating that all of the transaction data fed into the first model 802 is sorted into the first cluster 804 and the second cluster 806. Moreover, Backing Application 3 is assigned to the first cluster 804 and Backing Application 1 is assigned to the second cluster 806. Although the example illustrated in FIG. 8A shows the first cluster 804 and the second cluster 806 associated with different backing applications, it is contemplated that the same backing application can be used for different clusters.

With reference to FIG. 8B, an additional clustering process is performed for the second cluster 806. The additional clustering process may be performed because Backing Application 1 does not satisfy the client parameters (for example, one of the client parameters 34A, 34B, . . . , 34N). As for the first cluster 804, no additional clustering process is performed because, for example, a stopping criteria (for example, a number of backing application, fraud detection performance, budget, and so forth) has been satisfied. In some embodiments, no additional clustering process is performed if a given cluster (for example, the first cluster 804) cannot be divided into distinguishable subclusters.

In the example shown in FIG. 8, a second model 808 ("Model 2") is used to generate three different subclusters 810, 812, 814 from the transaction data associated with the second cluster 806. A subcluster 810 is associated with Criteria B1 (for example, transaction amount less than $100) and includes F % of the transaction data provided to the second model 808, a subcluster 812 is associated with Criteria B2 (for example, transaction amount greater than $100 and less than $1,000) and includes G % of the transaction data provided to the second model 808, and a subcluster 814 is associated with Criteria B3 (for example, transaction amount greater than $1,000 and less than $10,000) and includes H % of the transaction data provided to the second model 808. Moreover, Backing Application 2 is assigned to the subcluster 812 and Backing Application 4 is assigned to the subcluster 814. In this example, the sum of F, G, and H is 100, indicating that all of the transaction data fed into the second model 808 is sorted into the subclusters 810, 812, 814.

In the example shown in FIG. 8B, no backing application is assigned to the subcluster 810 since Backing Application 1 assigned to the first cluster 806 can alone satisfy client parameter (for example, fraud detection performance) for transaction data assigned to the subcluster 810. In other words, for transaction data associated with Criteria B1, Backing Application 1 assigned to the first cluster 806 can, for example, provide a fraud detection rate (for example, 95%) or performance index that can satisfy client parameters, such that no additional backing application is needed.

With reference to FIG. 8C, the transaction data of the subcluster 812 is used to generate a third model 816 that determines two subclusters 818, 820. A subcluster 818 is associated with Criteria C1 (for example, credit history less than 3 years) and includes N % of the transaction data provided to the third model 816 and a subcluster 820 is associated with Criteria C2 (for example, credit history greater than or equal to 3 years) and includes M % of the transaction data provided to the third model 816. In this example, the sum of N and M is 100, indicating that all of the transaction data fed into the third model 816 is sorted into the subclusters 818, 820.

In the example shown in FIG. 8C, Backing Application 6 is assigned to the subcluster 820 while no backing application is assigned to subcluster 818. This can be because a combination of Backing Application 1 (assigned to the first cluster 806) and Backing Application 2 (assigned to subcluster 812) satisfies client parameters for transaction data of subcluster 818, and no additional backing application is needed.

In some embodiments, no additional backing application may be assigned to a cluster or a subcluster (for example, the subcluster 818) if no additional backing application can provide, for example, sufficient increase in fraud detection performance. For example, the combination of Backing Application 1 (assigned to the first cluster 806) and Backing Application 2 (assigned to subcluster 812) can predict fraudulent or potentially fraudulent transactions at 91% of the time for transactions associated with the subcluster 818. The workflow orchestration system 120 can apply additional backing applications (for example, Backing Application 3 or Backing Application 6) and see if a combination of Backing Applications 1, 2, and 3 or a combination of Backing Applications 1, 2, and 6 improves fraud detection performance for the subcluster 818. If using an additional backing application reduces the fraud detection performance (for example, decreases from 91% to 85%), maintains the same fraud detection performance (for example, stays the same at 91%), or increases the fraud detection performance only marginally (for example, increases from 91% to 91.5%), no additional backing application may be used for the subcluster 818. In some embodiments, a client can provide a parameter including a threshold performance rate increase (for example, 5%) for determining whether to use an additional backing application.

After assigning Backing Application 6 to the subcluster 820, the workflow orchestration system 120 can determine whether a combination of Backing Applications 1, 2, and 6 is sufficient to satisfy client parameters (for example, a fraud detection performance threshold) for the subcluster 820. If so, the workflow orchestration system 120 can store the combination of Backing Applications 1, 2, and 6 as a set of backing applications for detecting fraudulent or potentially fraudulent transactions among transactions associated with criteria associated with the subcluster 820 (that is, Criteria A2, B2, and C2). If the combination of Backing Applications 1, 2, and 6 does not satisfy client parameters, another iteration of generating new subclusters (for example, off of the subcluster 820), assigning backing applications for the new subclusters, and evaluating performances of those backing applications for the new subclusters can be applied to the subcluster 820.

In some embodiments, as described herein, clients may not wish to have more than a certain number of backing applications to minimize or reduce cost or to maximize or improve ROI. For example, a client may not wish to have more than 3 backing applications for any fraud detection workflow. As such, in the example shown in FIG. 8C, no further clustering may be performed for the subcluster 820 in order to satisfy the client's limit to the number of backing applications. Further, in some embodiments, the model determines how many clusters to use based on the performance of the selected backing applications. However, in other embodiments, the client parameters may indicate, for example, that the model should at most generate 2 clusters or 3 clusters at each level.

Fraud Detection Workflow Generation Process-Additional Embodiments

Figure 9A:
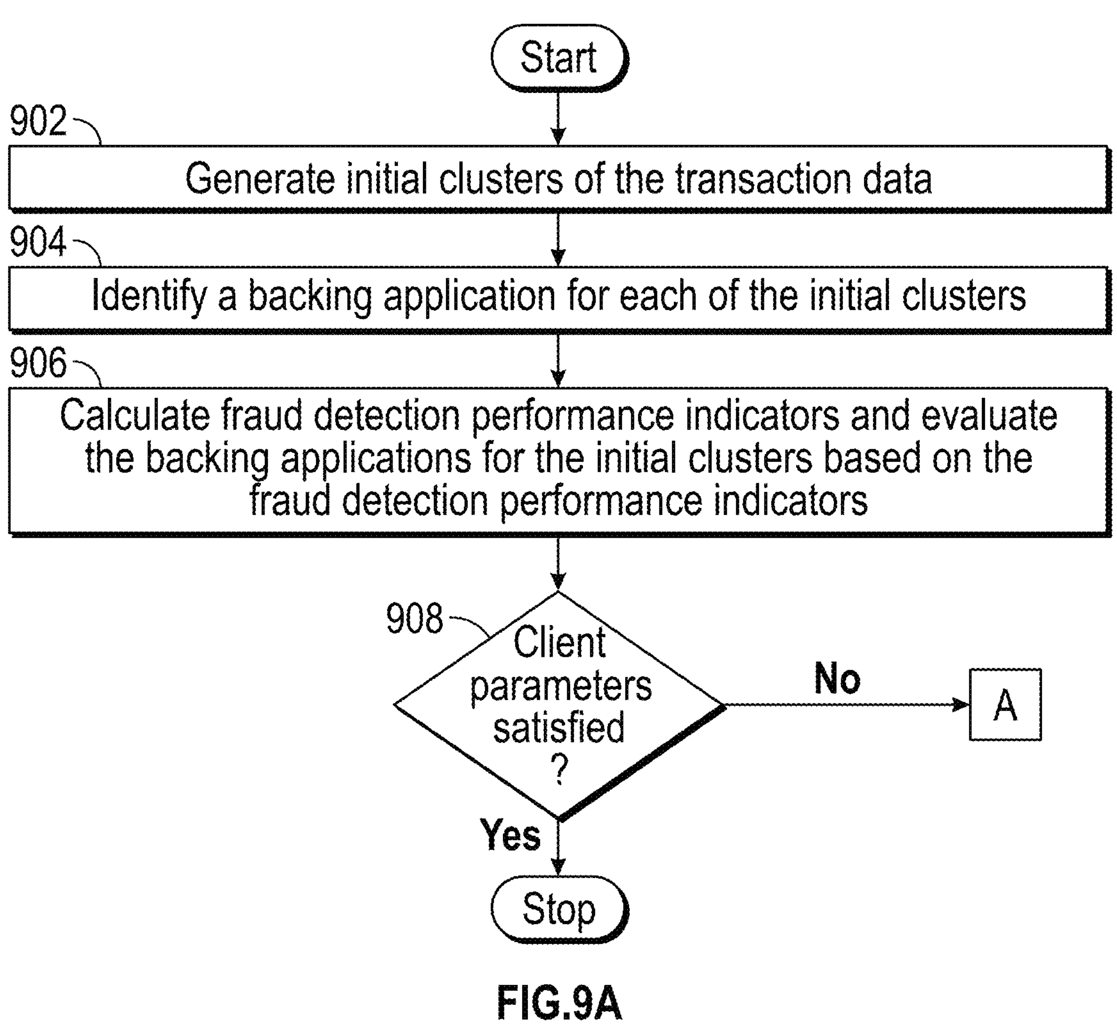
FIGS. 9A, 9B, and 9C are flow diagrams illustrating an embodiment of a process for generating a fraud detection workflow.
Figure 9B:
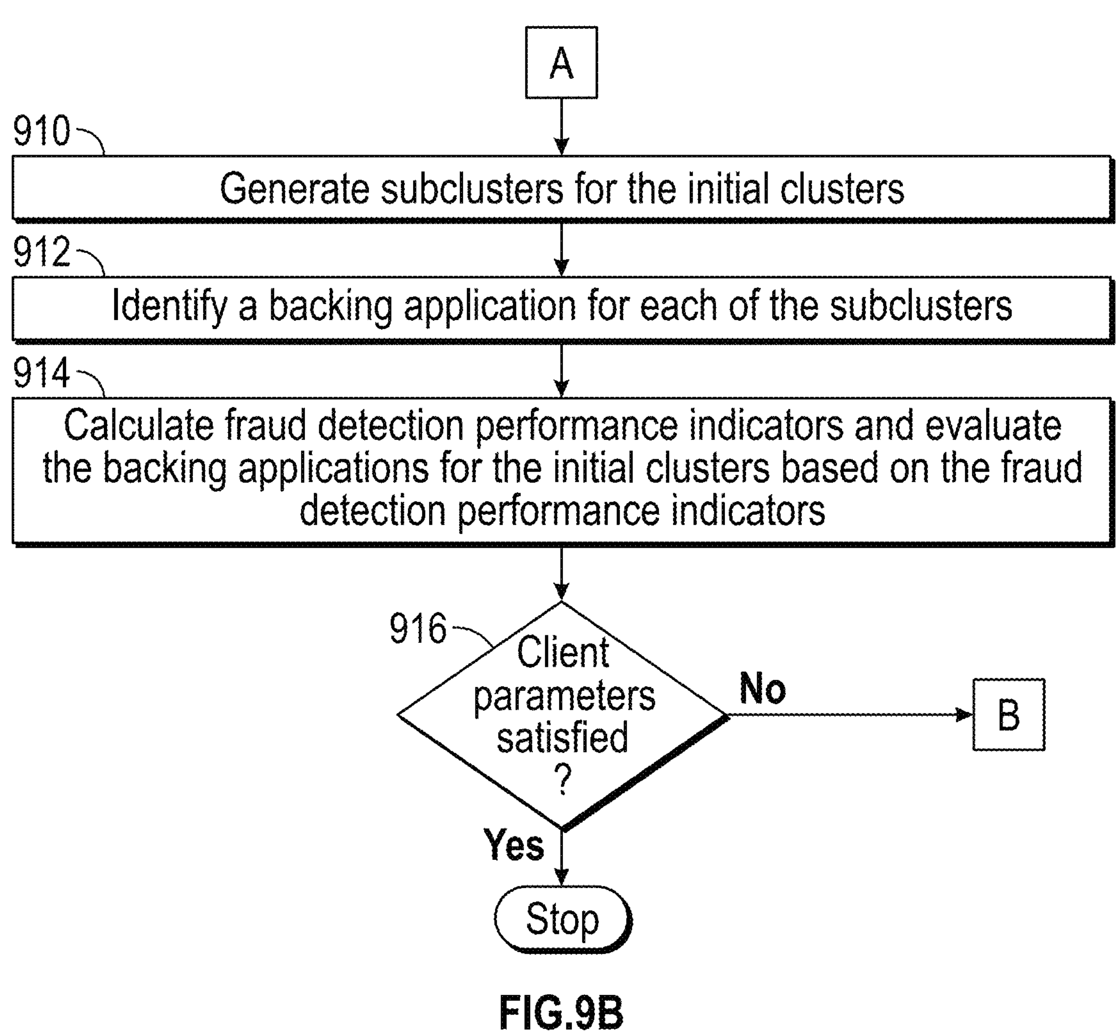
Figure 9C:
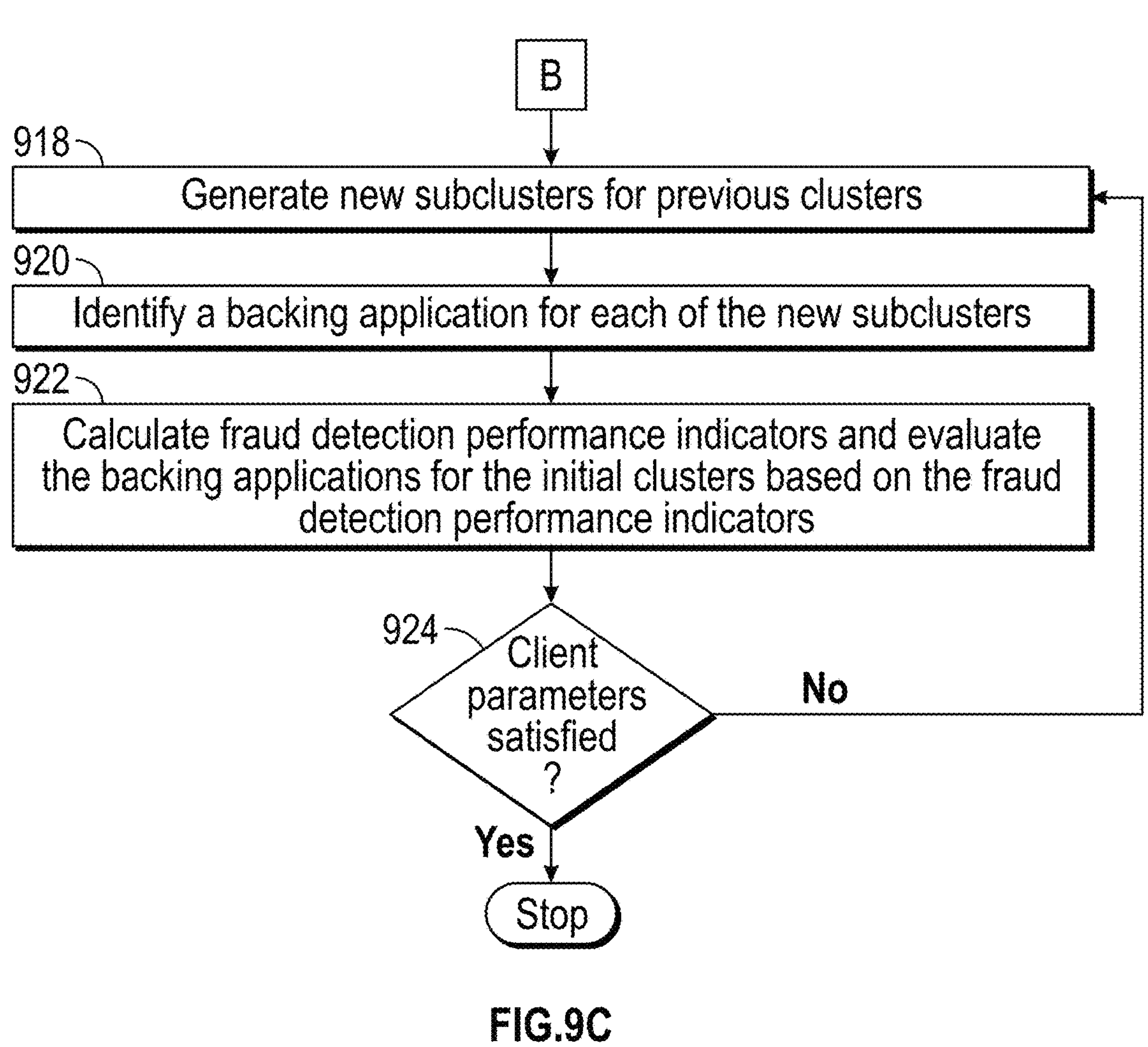

FIGS. 9A-9C show flow diagrams that illustrate another example embodiment of a method 900 for generating a fraud detection workflow for a client. At block 902, the workflow orchestration system 120 can generate initial clusters of transaction data received from a client (for example, one of the clients 30A, 30B, . . . , 30N). The transaction data can be real transaction data with truth-marked data used for training the machine learning module 210. The clusters can be generated based on one or more attributes (for example, consumer device profile, transaction amount, consumer credit history, and so forth).

At block 904, the workflow orchestration system 120 can identify a backing application (for example, an application for identifying potential fraudulent transactions) for each of the initial clusters. The identification of a backing application for each of the initial clusters can be based on previous training of the machine learning module 210 using a training dataset (for example, truth-marked transaction data). The identification of a backing application for each of the initial clusters, can include applying more than one backing application to each of the initial clusters and determining which backing application provides the greatest likelihood (for example, highest accuracy) of detecting fraudulent (or potentially fraudulent) transactions in each of the initial clusters. In some embodiments, the initial clusters can be assigned a different backing application from each other. In some embodiments, some of the initial clusters can share the same backing application. In some embodiments, the backing application is selected when the clusters are determined.

At block 906, the workflow orchestration 120 can calculate fraud detection performance indicators and evaluate the backing applications assigned to the initial clusters based on the calculated fraud detection performance indicators. At block 908, the workflow orchestration system 120 can determine whether client parameters are satisfied. For example, the workflow orchestration system 120 can compare the calculated fraud detection performance indicators with a predetermined performance threshold value or index. If the client parameters are satisfied for a given initial cluster and a corresponding backing application, the process 900 can end. In contrary, if the client parameters are not satisfied for a given initial cluster and a corresponding backing application, the process 900 can proceed to block 910 (see FIG. 9B).

At block 910, the workflow orchestration system 120 can generate subclusters for each initial cluster (and its backing application) that failed to satisfy the client parameters. At block 912, the workflow orchestration system 120 can identify a backing application for each of the subclusters. The backing applications for the subclusters may not be limited to those backing applications that were not assigned (or used) for the initial clusters. As described herein, the identification of a backing application for a given subcluster can include applying more than one backing application to the given subcluster and determining performance (for example, accuracy) of each backing application in, for example, identifying potentially fraudulent transactions from the subcluster. For example, a backing application with the highest performance index (for example, the highest accuracy) for identifying potentially fraudulent transactions may be selected. In some embodiments, the backing application is selected when the subclusters are determined.

At block 914, the workflow orchestration system 120 can calculate fraud detection performance indicators (for example, a score or an index) for the backing applications identified (or selected) for each of the subclusters at block 912. At block 916, the workflow orchestration system 120 can determine whether the client parameters are satisfied. For example, the workflow orchestration system 120 may determine whether fraud detection performance indicator associated with each of the backing applications identified for each of the subclusters at block 912 satisfy, for example, a predetermined performance index or score. In some embodiments, other types of parameters (for example, a number of backing applications used or the total cost of backing applications) may be used to determine whether the client parameters are satisfied. If the client parameters are satisfied, the method 900 ends. In contrast, if the client parameters are not satisfied, the method 900 continues to block 918 (see FIG. 9C).

At block 918, the workflow orchestration system 120 can generate new subclusters for each subcluster (and its backing application) that failed to satisfy the client parameters (for example, at block 916). At block 920, the workflow orchestration system 120 can identify a backing application for each of the new subclusters. The backing applications for the new subclusters may not be limited to those backing applications that were not assigned (or used) for the previous subclusters. As described herein, the identification of a backing application for a given new subcluster can include applying more than one backing application to the given new subcluster and determining performance (for example, accuracy) of each backing application in, for example, identifying potentially fraudulent transactions from the new subcluster. For example, a backing application with the highest performance index (for example, the highest accuracy) for identifying potentially fraudulent transactions may be selected. In some embodiments, the backing application is selected when the subclusters are determined.

At block 922, the workflow orchestration system 120 can calculate fraud detection performance indicators (for example, a score or an index) for the backing applications identified (or selected) for each of the subclusters at block 920. At block 924, the workflow orchestration system 120 can determine whether the client parameters are satisfied. For example, the workflow orchestration system 120 may determine whether fraud detection performance indicator associated with each of the backing applications identified for each of the subclusters at block 918 satisfy, for example, a predetermined performance index or score. In some embodiments, other types of parameters (for example, a number of backing applications used or the total cost of backing applications) may be used to determine whether the client parameters are satisfied. If the client parameters are satisfied, the method 900 ends. In contrast, if the client parameters are not satisfied, the method 900 continues to block 918 to identify another set of new clusters (for example, for each subcluster (and its backing application) that failed to satisfy the client parameters (for example, at block 924).

Example Fraud Detection Workflow

Figure 10A:
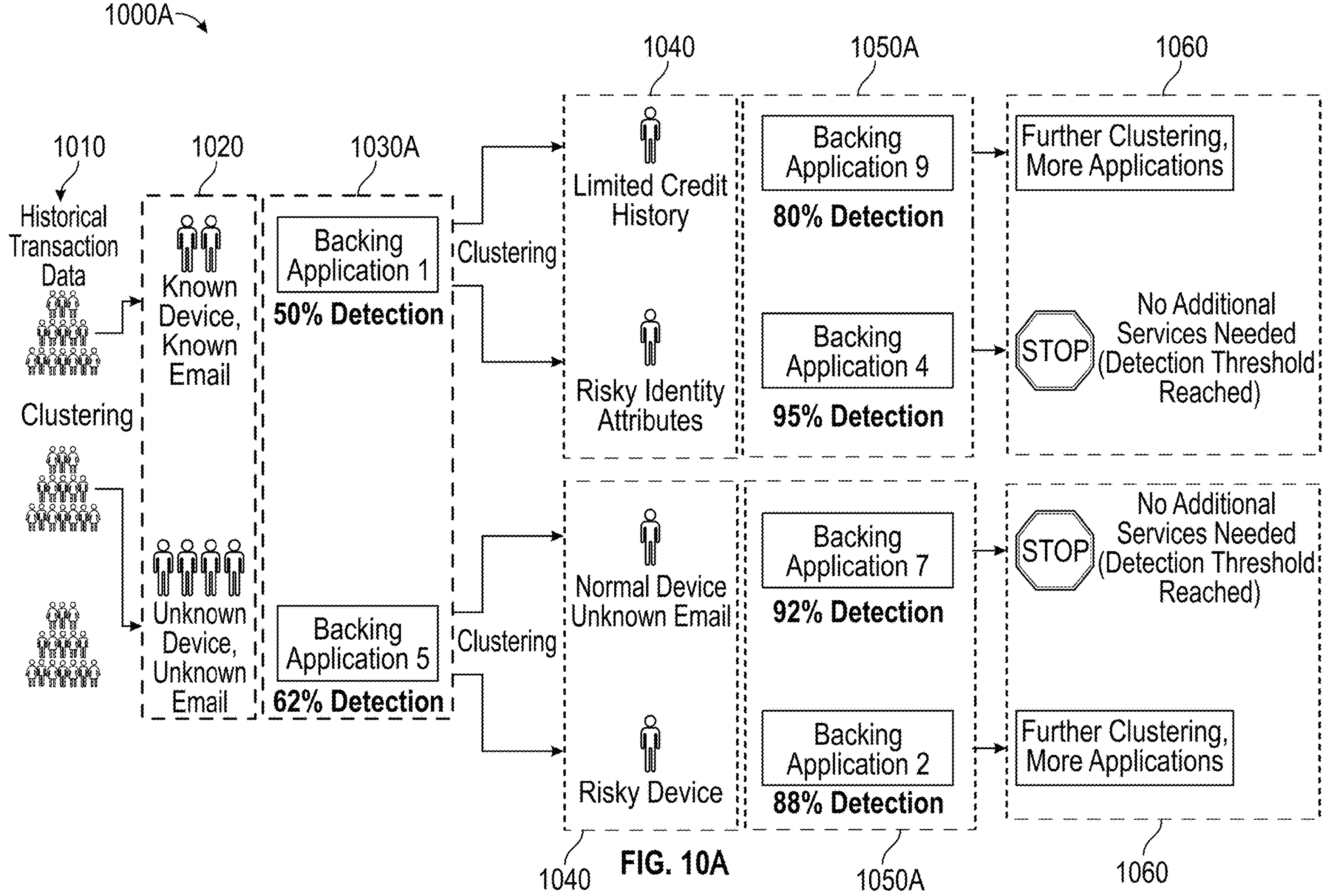
FIGS. 10A and 10B are block diagrams illustrating example embodiments of a process for generating a fraud detection workflow.

FIG. 10A is an embodiment of a flow diagram illustrating an example process 1000A for generating a fraud detection workflow. The workflow orchestration system 120 can receive historical transaction data 1010 from a client (for example, one of the clients 30A, 30B, . . . , 30N). The workflow orchestration system 120 can cluster or divide the historical transaction data 1010 into clusters 1020. In the example shown in FIG. 10, the historical transaction data 1010 is divided into two clusters, where a first cluster is associated with known device and known email address while a second cluster is associated with unknown device and unknown email address. The workflow orchestration 120 can apply backing applications 1030A to the clusters 1020 and determine a suitable (or one with the highest fraud detection rate) backing application for each of the cluster 120 based on the historical transaction data 1010.

In some embodiments, the workflow orchestration system 120 employ backing applications (for example, fraud or identity risk services) including, but not limited to, identity verification, device intelligence, email intelligence, document verification, behavioral biometrics, phone intelligence, social media data, alternative identity data, and so forth.

As described herein, the historical transaction data 1010 can include truth-marked data that can indicate which of the historical transaction data 1010 is fraudulent and which is not fraudulent. In the example shown in FIG. 10A, the workflow orchestration system 120 identified "Backing Application 1" as a backing application for the first cluster with known device and known email address and "Backing Application 5" for the second cluster with unknown device and unknown email address.

After identifying backing addresses for the clusters 1020, the workflow orchestration system 120 (for example, via the fraud detection performance calculator 250) can calculate, for example, fraud detection performance for "Backing Application 1" and "Backing Application 5" for clusters 1020 using the historical transaction data. In the example shown in FIG. 10, the fraud detection performance of "Backing Application 1" and "Backing Application 5" backing applications are 50% and 62%, respectively. Assuming that the client's fraud performance parameter (or threshold value) is 90%, neither "Backing Application 1" nor "Backing Application 5" satisfies the client parameter and additional clustering can be performed.

In the example shown in FIG. 10A, the first cluster (associated with known device and known email address) is divided into two subclusters 1040 (that is, Limited Credit History subcluster and Risky Identity Attributes subcluster) using the historical transaction data, and the second cluster (associated with unknown device and unknown email address) is divided into two subclusters 1040 (that is, Normal Device Unknown Email subcluster and Risky Device subcluster) using the historical transaction data. After the subclusters 1040 are generated based on attributes associated with transaction data of the clusters 1020 and/or historical transaction data 1010, backing applications 1050A can be assigned to each of the subclusters 1040 and their fraud detection performances calculated. In the example shown in FIG. 10A, "Backing Application 9" is assigned to the Limited Credit History subcluster, "Backing Application 4" is assigned to the Risky Identity Attributes subcluster, "Backing Application 7" is assigned to the Normal Device Unknown Email subcluster, and "Backing Application 2" is assigned to the Risky Device subcluster.

Based on the calculated fraud detection performances of the backing applications 1050A for the subclusters 1040, different actions 1060 can be taken. For example, "Backing Application 9" is assigned as a backing application to the Limited Credit History subcluster 1040 and has 80% fraud detection rate (that is, can detect fraud or potentially fraudulent transactions with 80% accuracy). Since this is less than the client parameter (for example, greater than 90% detection rate), further clustering and more backing applications may be utilized. On the other hand, "Backing Application 4" backing application is assigned to the Risky Identity Attributes subcluster 1040 and has 95% fraud detection rate (that is, can detect fraud or potentially fraudulent transactions with 95% accuracy). Since this satisfies the client parameter (for example, greater than 90% detection rate), no additional clustering or backing application may be utilized.

Figure 10B:
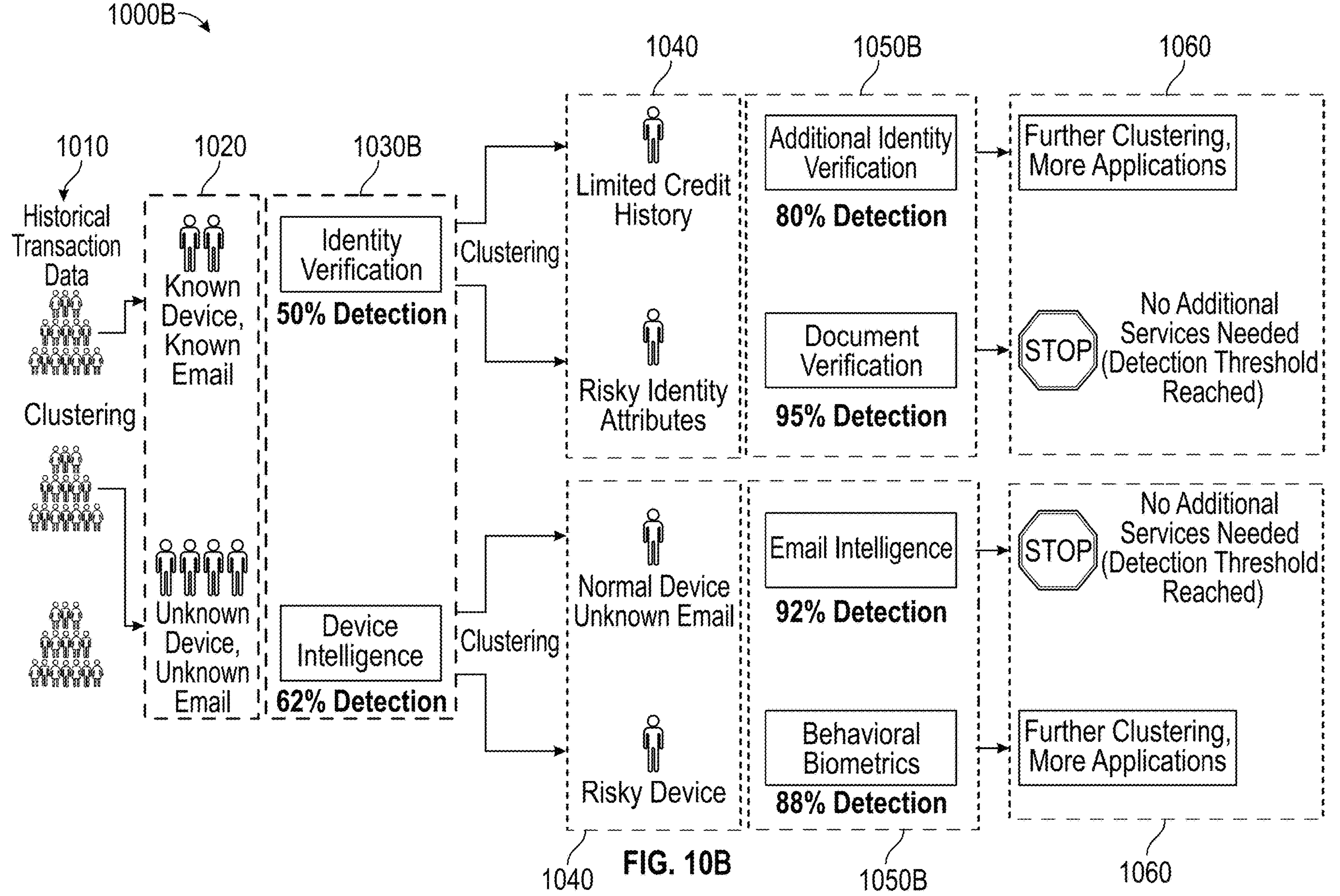

FIG. 10B is an embodiment of another flow diagram illustrating an example process 1000B for generating a fraud detection workflow. The example illustrated in FIG. 10B provides example backing applications 1030B, 1050B used for each of the clusters 1030 and subclusters 1040. With reference to FIGS. 10A and 10B, the backing applications 1030A, 1030B, 1050A, 1050B, the clusters 1020, the subclusters 1040, attributes, detection rates, the actions 1060 are provided only as examples, not to limit the scope of the disclosure herein.

Fraud Detection Workflow Update Process

Figure 11:
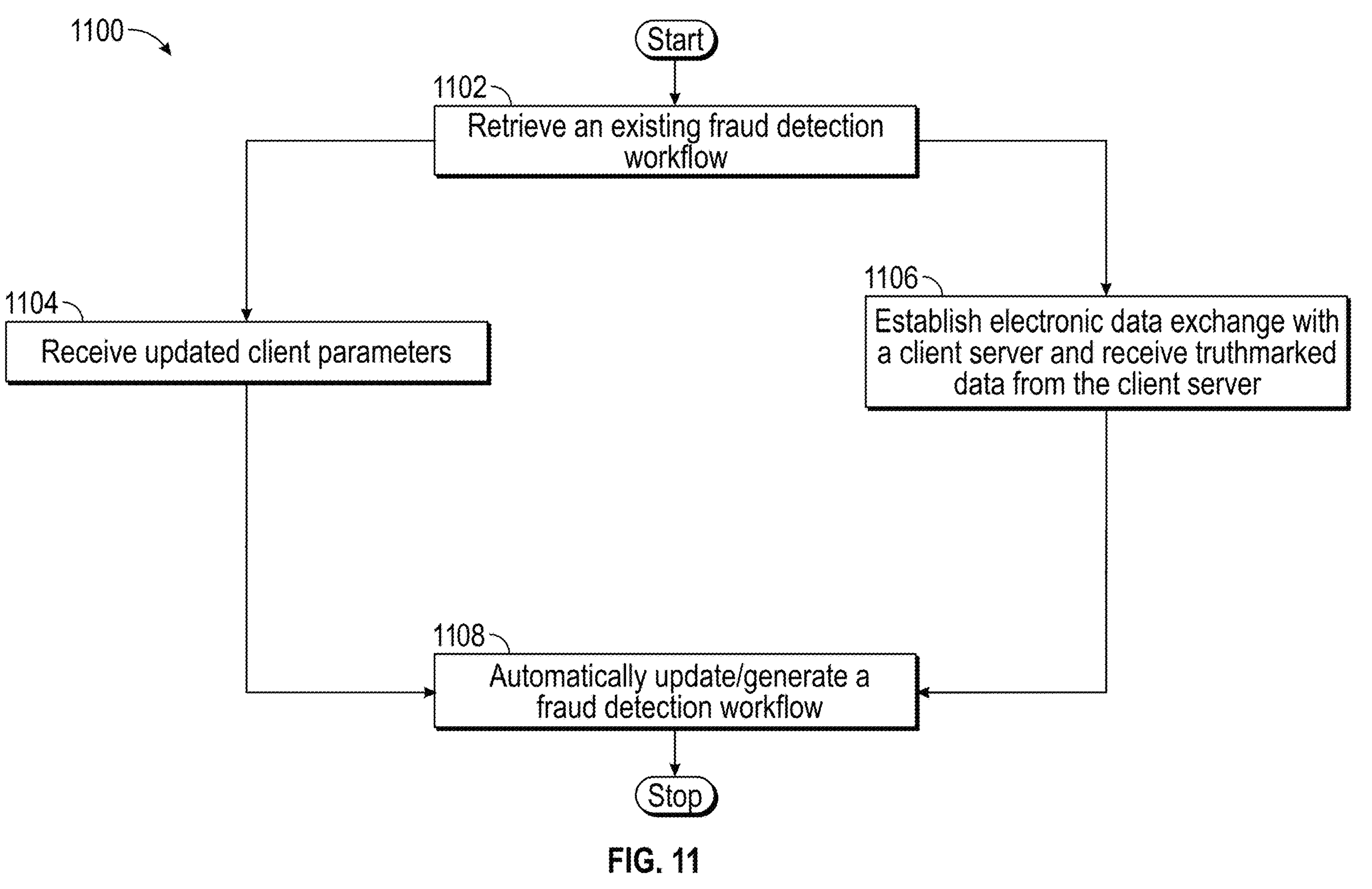
FIG. 11 is a flow diagram illustrating an embodiment of a process for updating an existing fraud detection workflow.

FIG. 11 is a flow diagram illustrating an example embodiment of a method 1100 for updating an existing detection workflow. As described herein, the decision analytics system 100 (or the workflow orchestration system 120 of the decision analytics system 100) can receive new data from a client (for example, one of the clients 30A, 30B, . . . , 30N) and use the data to update an existing fraud detection workflow for the client. The data can include a new set of client parameter (for example, updated version of one of the client parameters 34A, 34B, . . . , 34N) and/or new historical transaction data (with truth-marked data) that can be used to, for example, train or retrain the models by the machine learning module 210 of the workflow orchestration system 120. Generating a new fraud detection workflow or updating an existing fraud detection workflow can be done periodically or in response to a request by a client.

At block 1102, the workflow orchestration system 120 can retrieve an existing fraud detection workflow associated with a client. As described herein, the existing fraud detection workflow can be retrieved at a predetermined interval (for example, every day, every week, every month, every 2 months, every 6 months, every year, and so forth) or in response to a request from the client. In some embodiments, the existing fraud detection workflow may be stored in the storage device 200 of the workflow orchestration system 120, in a storage device of the decisioning system 110, storage devices associated with the client, or storage devices associated with a third party.

At block 1104, the workflow orchestration system 120 can receive updated client parameters. At block 1106, the workflow orchestration system 120 can establish an electronic data exchange with a client server to receive truth-marked transaction data (and/or new transaction data with truth-marked data). It is contemplated that the workflow orchestration system 120 can receive the updated client parameters and the truth-marked transaction data at the same time or one after another. At block 1108, the workflow orchestration system 120 can update the existing fraud detection workflow or generate a new updated fraud detection workflow based on the updated client parameters and/or the newly received transaction data. The process of updating the existing fraud detection workflow or generating a new fraud detection workflow can include one or more of the processes described herein.

In some embodiments, workflow updates may be automated. For example, workflow updates may be run on a scheduled basis or manually run by a client. Workflows may be updated accordingly as more data becomes available. Utilizing big data technology and advanced machine learning (supervised or unsupervised), historical event data can be pulled from a data repository, and then the workflow building/updating process can be triggered using, for example, the most recent truth-marked data to generate the next series of customer segments and workflows.

Example System Implementation and Architecture

Figure 12:
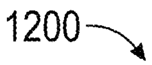
FIG. 12 is a general system diagram illustrating an embodiment of a computing system.
Figure 12:
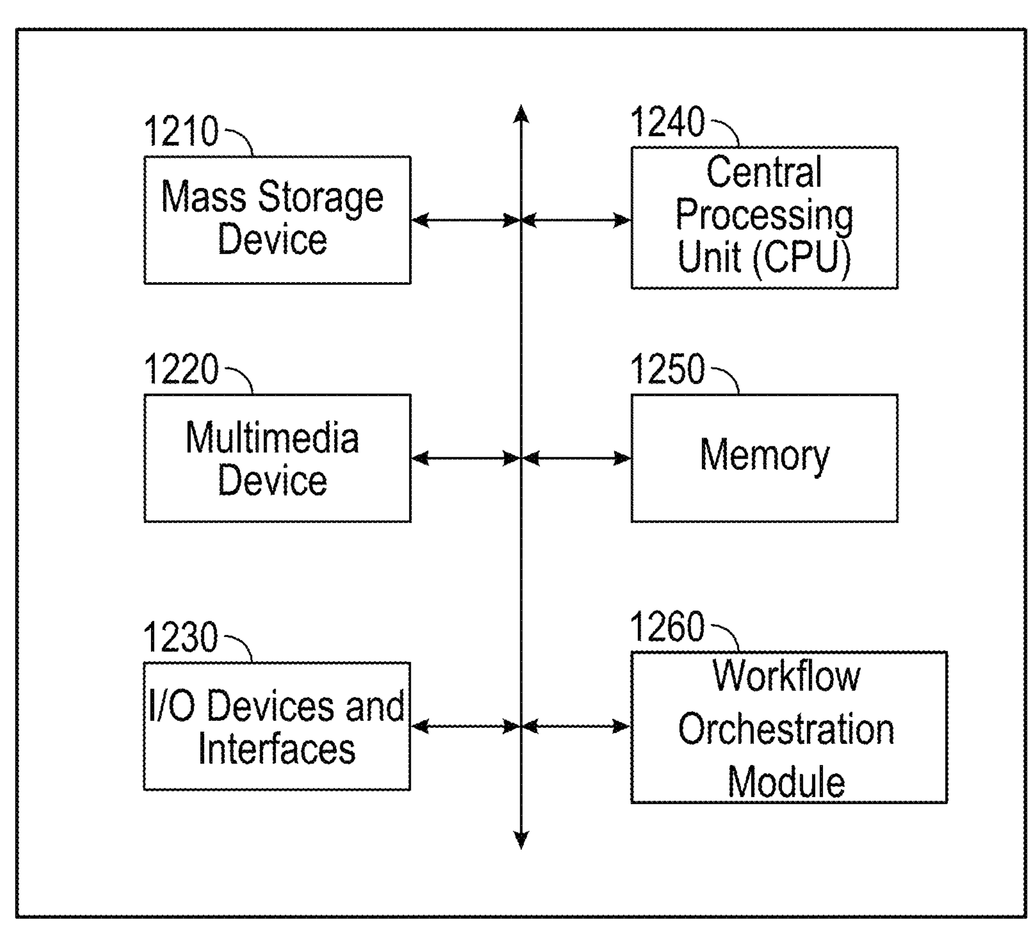

In some embodiments, any of the systems, servers, or components referenced herein including, for example, the network 40, the transaction databases 32A, 32B, . . . , 32N, the decision analytics system 100, the decisioning system 110, the workflow orchestration system 120 may take the form of a computing system as shown in FIG. 12 which illustrates a block diagram of an embodiment of a computing device 1200. The computing device 1200 may include, for example, one or more personal computers that is IBM, Macintosh, or Linux/Unix compatible or a server or workstation. In one embodiment, the computing device 1200 comprises a server, a laptop computer, a smart phone, a personal digital assistant, a tablet, or a desktop computer, for example. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth. As shown in FIG. 12, the computing device 1200 can include one or more processor 1240, which may each include a conventional or proprietary microprocessor. The processor 1240 can be a central processing unit (CPU) or a graphics processing unit (GPU). The computing device 1200 can further include one or more memory 1250, such as random access memory (RAM) for temporary storage of information, one or more read only memory (ROM) for permanent storage of information, and one or more mass storage device 1210, such as a hard drive, diskette, solid state drive, or optical media storage device. The computing device 1200 may also include a token module 1260 which performs one or more of the processes discussed herein. In some embodiments, the components of the computing device 1200 are connected to the computer using a standard based bus system. In different embodiments, the standard based bus system could be implemented in Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of computing device 1200 may be combined into fewer components and modules or further separated into additional components and modules.

The computing device 1200 can be generally controlled and coordinated by operating system software, such as Windows XP, Windows Vista, Windows 7, Windows 8, Windows 10, Windows Server, Unix, Linux (and its variants such as Debian, Linux Mint, Fedora, and Red Hat), SunOS, Solaris, Blackberry OS, or other compatible operating systems. In Macintosh systems, the operating system may be any available operating system, such as iOS or MAC OS X. In other embodiments, the computing device 1200 may be controlled by a proprietary operating system. Conventional operating systems control and schedule computer processes for execution, perform memory management, provide file system, networking, I/O services, and provide a user interface, such as a graphical user interface (GUI), among other things.

The illustrated computing device 1200 may include one or more commonly available input/output (I/O) devices and interfaces 1230, such as a keyboard, mouse, touchpad, and printer. In one embodiment, the I/O devices and interfaces 1230 can include one or more display devices, such as a monitor, that allows the visual presentation of data to a user. More particularly, a display device provides for the presentation of GUIs, application software data, reports, benchmarking data, metrics, and/or multimedia presentations, for example. The computing device 1200 may also include one or more multimedia devices 1220, such as speakers, video cards, graphics accelerators, and microphones, for example.

In the embodiment shown in FIG. 12, the I/O devices and interfaces 1220 can provide a communication interface to various external devices. For example, the computing device 1200 can be electronically coupled to one or more networks, which comprise one or more of a LAN, WAN, and/or the Internet, for example, via a wired, wireless, or combination of wired and wireless, communication link. The networks communicate with various computing devices and/or other electronic devices via wired or wireless communication links, such as the ERP data sources.

In some embodiments, information may be provided to the computing device 1200 over a network from one or more data sources. The data sources may include one or more internal and/or external data sources. In some embodiments, one or more of the databases or data sources may be implemented using a relational database, such as Sybase, Oracle, CodeBase, PostgreSQL, and Microsoft® SQL Server as well as other types of databases such as, for example, a NoSQL database (for example, Couchbase, Cassandra, or MongoDB), a flat file database, an entity-relationship database, an object-oriented database, a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MogoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), a non-relational database, or a record-based database.

In general, the word "module," as used herein, refers to logic embodied in hardware or firmware, or to a collection of software instructions, possibly having entry and exit points, written in a programming language, such as, for example, Java, Lua, C, C#, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 1200, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In the example shown in FIG. 12, the workflow orchestration module 808 can be executed by the processor 1240 to perform any or all of the processes discussed herein. Depending on the embodiment, certain processes, or in the processes, or groups of processes discussed herein may be performed by multiple devices, such as multiple computing systems similar to computing device 1200.

ADDITIONAL EMBODIMENTS

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein, the terms "determine" or "determining" encompass a wide variety of actions. For example, "determining" may include calculating, computing, processing, deriving, generating, obtaining, looking up (for example, looking up in a table, a database or another data structure), ascertaining and the like via a hardware element without user intervention. Also, "determining" may include receiving (for example, receiving information), accessing (for example, accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (for example, hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A system for generating and executing an automated fraud detection workflow, the system comprising:
- a processor;
- a memory; and
- computer code stored in the memory, wherein the computer code, when retrieved from the memory and executed by the processor, causes the processor to:
  - electronically access transaction data associated with a plurality of consumers and a time range;
  - electronically access a plurality of executable fraud detection applications configured to provide fraud detection analyses, wherein each of the plurality of executable fraud detection applications are configured to conduct fraud detection analysis based on specific transaction data attributes;
  - generate a first cluster by:
    - inputting into a machine learning model, the transaction data, wherein the machine learning model has been trained based on historical transaction data, and
    - receiving, from the machine learning model, an output comprising the first cluster, wherein the first cluster comprises a first plurality of transactions, and wherein the first cluster is associated with one or more first clustering criteria;
  - assign a first executable fraud detection application of the plurality of executable fraud detection applications to the first cluster based on a likelihood that the first executable fraud detection application more accurately identifies fraud for the first cluster than any other executable fraud detection application of the plurality of executable fraud detection applications;
  - in response to determining that the first executable fraud detection application does not satisfy a stopping criterion, generate a second cluster different from the first cluster, wherein the second cluster comprises a subset of transactions of the first plurality of transactions, wherein the second cluster is associated with one or more second clustering criteria, and wherein the stopping criterion comprises at least one parameter pertaining to performance or a maximum number of fraud detection applications, wherein the at least one parameter pertaining to performance comprises an accuracy threshold for detecting potentially fraudulent transactions;
  - assign a second executable fraud detection application of the plurality of executable fraud detection applications to the second cluster;
  - in response to determining that the second executable fraud detection application satisfies the stopping criterion, generate a fraud detection workflow comprising the first executable fraud detection application and the second executable fraud detection application;
  - in response to receiving a first transaction and determining that the first transaction satisfies the one or more first clustering criteria and the one or more second clustering criteria, execute the fraud detection workflow to determine a likelihood that the first transaction may be fraudulent; and
  - based on execution of the fraud detection workflow, identify the first transaction as potentially fraudulent.

2. The system of claim 1, wherein the transaction data includes one or more of an email address, geographic data, internet service provider data, age range, or device information.

3. The system of claim 1, wherein the transaction data attributes comprise one or more of consumer profile information, device information, or transaction information.

4. The system of claim 3, wherein the one or more first clustering criteria comprise one or more transaction data attributes.

5. The system of claim 1, wherein the computer code, when retrieved from the memory and executed by the processor further causes the processor to:
- in response to determining that the first executable fraud detection application does not satisfy the stopping criterion, generate a third cluster, different from the first cluster and the second cluster, wherein the third cluster comprises a subset of transactions of the first plurality of transactions, and wherein the third cluster is associated with one or more third clustering criteria; and assign a third executable fraud detection application of the plurality of executable fraud detection applications the third cluster.

6. The system of claim 5, wherein the computer code, when retrieved from the memory and executed by the processor further causes the processor to:

in response to determining that the third executable fraud detection application does not satisfy the stopping criterion, generate a fourth cluster; and assign a fourth executable fraud detection application of the plurality of executable fraud detection applications to the fourth cluster.

7. The system of claim 1, wherein a first criterion of the one or more first clustering criteria is at least one of user information, device information, or transaction information.

8. The system of claim 1, wherein the machine learning model is an unsupervised learning machine learning model.

9. The system of claim 1, wherein the computer code, when retrieved from the memory and executed by the processor further causes the processor to assign the first executable fraud detection application to the first cluster based on a greedy algorithm.

10. The system of claim 1, wherein the plurality of executable fraud detection applications are associated with one or more of: identity verification, device intelligence, email intelligence, document verification, behavioral biometrics, phone intelligence, social media data, or alternative identity data.

11. The system of claim 1, wherein to execute the fraud detection workflow, the computer code, when retrieved from the memory and executed by the processor further causes the processor to:

execute the first executable fraud detection application and the second executable fraud detection application.

12. A computer-implemented method for generating and executing an automated fraud detection workflow, the computer-implemented method comprising:

generating a first cluster, wherein the first cluster comprises transaction data from a first plurality of transactions, and wherein the first cluster is associated with one or more first clustering criteria;

assigning a first executable fraud detection application of a plurality of executable fraud detection applications to the first cluster based on a likelihood that the first executable fraud detection application more accurately identifies fraud for the first cluster than at least one other executable fraud detection application of the plurality of executable fraud detection applications;

in response to determining that the first executable fraud detection application does not satisfy a stopping criterion, generating a second cluster, different from the first cluster, wherein the second cluster comprises a subset of transactions of the first plurality of transactions, wherein the second cluster is associated with one or more second clustering criteria, and wherein the stopping criterion comprises at least one parameter pertaining to performance or a maximum number of fraud detection applications;

assigning a second executable fraud detection application of the plurality of executable fraud detection applications to the second cluster;

in response to determining that the second executable fraud detection application satisfies the stopping criterion, generating a fraud detection workflow comprising the first executable fraud detection application and the second executable fraud detection application;

in response to receiving a first transaction and determining that the first transaction satisfies the one or more first clustering criteria and the one or more second clustering criteria, executing the fraud detection workflow to determine a likelihood that the first transaction may be fraudulent; and based on execution of the fraud detection workflow, identify the first transaction as potentially fraudulent.

13. The computer-implemented method of claim 12, wherein the transaction data includes one or more of an email address, geographic data, internet service provider data, age range, or device information.

14. The computer-implemented method of claim 12, wherein each of the plurality of executable fraud detection applications are configured to conduct fraud detection analysis based on specific transaction data attributes, wherein the transaction data attributes comprise one or more of consumer profile information, device information, or transaction information.

15. The computer-implemented method of claim 14, wherein the one or more first clustering criteria comprise one or more transaction data attributes.

16. The computer-implemented method of claim 12, further comprising:

in response to determining that the first executable fraud detection application does not satisfy the stopping criterion, generating a third cluster, different from the first cluster and the second cluster, wherein the third cluster comprises a subset of transaction of the first plurality of transactions, and wherein the third cluster is associated with one or more third clustering criteria; and assigning a third executable fraud detection application of the plurality of executable fraud detection applications to the third cluster.

17. The computer-implemented method of claim 16, further comprising:

in response to determining that the third executable fraud detection application does not satisfy the stopping criterion, generate a fourth cluster; and assign a fourth executable fraud detection application of the plurality of executable fraud detection applications to the fourth cluster.

18. A non-transitory computer storage medium storing computer-executable instructions that, when executed by one or more processors, cause one or more processors to at least:

generate a first cluster, wherein the first cluster comprises transaction data from a first plurality of transactions, and wherein the first cluster is associated with one or more first clustering criteria;

assign a first executable fraud detection application of a plurality of executable fraud detection applications to the first cluster based on a likelihood that the first executable fraud detection application more accurately identifies fraud for the first cluster than at least one other executable fraud detection application of the plurality of executable fraud detection applications;

in response to determining that the first executable fraud detection application does not satisfy a stopping criterion, generate a second cluster, different from the first cluster, wherein the second cluster comprises a subset of transactions of the first plurality of transactions, wherein the second cluster is associated with one or more second clustering criteria, and wherein the stopping criterion comprises at least one parameter pertaining to performance or a maximum number of fraud detection applications;

assign a second executable fraud detection application of the plurality of executable fraud detection applications to the second cluster;

in response to determining that the second executable fraud detection application satisfies the stopping criterion, generate a fraud detection workflow comprising the first executable fraud detection application and the second executable fraud detection application;

in response to receiving a first transaction and determining that the first transaction satisfies the one or more first clustering criteria and the one or more second clustering criteria, execute the fraud detection workflow to determine a likelihood that the first transaction may be fraudulent; and based on execution of the fraud detection workflow, identify the first transaction as potentially fraudulent.

19. The non-transitory computer storage medium of claim 18, wherein to generate the first cluster, the instructions, when executed by one or more processors, cause one or more processors to:

input into a machine learning model, the transaction data, wherein the machine learning model has been trained based on historical transaction data, and receive, from the machine learning model, an output comprising the first cluster.

20. The non-transitory computer storage medium of claim 18, wherein the at least one parameter pertaining to performance comprises an accuracy threshold for detecting potentially fraudulent transactions.

* * * * *